(12) United States Patent
Yam et al.

(10) Patent No.: US 11,360,328 B1
(45) Date of Patent: Jun. 14, 2022

(54) METHOD AND DEVICE FOR TREATING VISION IMPAIRMENT

(71) Applicant: NOVASIGHT LTD., Airport City (IL)

(72) Inventors: Ran Yam, Jerusalem (IL); Oren Yehezkel, Ramat Gan (IL); Dan Oz, Even Yehuda (IL); Tal Samet, Mazkeret Batya (IL)

(73) Assignee: NOVASIGHT LTD., Airport City (IL)

( * ) Notice: Subject to any disclaimer, the term of this patent is extended or adjusted under 35 U.S.C. 154(b) by 0 days.

(21) Appl. No.: 17/503,321

(22) PCT Filed: Apr. 5, 2021

(86) PCT No.: PCT/IB2021/052813
§ 371 (c)(1),
(2) Date: Oct. 17, 2021

(87) PCT Pub. No.: WO2021/205323
PCT Pub. Date: Oct. 14, 2021

(30) Foreign Application Priority Data

Apr. 6, 2020 (GB) ...................................... 2005040

(51) Int. Cl.
*G02C 7/06* (2006.01)
*G02B 27/00* (2006.01)

(52) U.S. Cl.
CPC ......... *G02C 7/061* (2013.01); *G02B 27/0093* (2013.01)

(58) Field of Classification Search
CPC ...... G02B 27/0093; G02C 7/061; G02C 7/06; G02C 7/02
(Continued)

(56) References Cited

U.S. PATENT DOCUMENTS 7,475,985 B2 1/2009 Blum et al.
9,977,257 B2 5/2018 Wooley et al.
(Continued)

FOREIGN PATENT DOCUMENTS

GB 2524500 A 9/2015
GB 2584546 B 12/2020
(Continued)

OTHER PUBLICATIONS

International Search Report and Written Opinion dated Jun. 30, 2021 and prepared by the Israel Patent Office for PCT/IB2021/052813, the PCT application of which is the International Stage Application corresponding to the instant application.
(Continued)

*Primary Examiner* — William R Alexander
(74) *Attorney, Agent, or Firm* — The Law Office of Joseph L. Felber

(57) ABSTRACT

Disclosed is a wearable optical devices for a human subject, comprising: a transparent lens; a wearable frame configured to maintain the lens in front of an eye of a human subject; a transparent pixelated active optical element where the pixels of the active optical element have an optical property with a changeable value; an eye tracker; and a controller configured to set a value for an optical property of the pixels of the active optical element so as to create an image mask through which at least some of the light reaching the eye passes through, thereby modifying the image formed on the retina of the first eye.

25 Claims, 8 Drawing Sheets

(58) Field of Classification Search
USPC .................................................... 351/159.4
See application file for complete search history.

(56) References Cited

U.S. PATENT DOCUMENTS

| | | | |
|---|---|---|---|
| 10,175,502 | B2 | 1/2019 | Holden et al. |
| 10,613,350 | B2 | 4/2020 | Lin et al. |
| 10,742,944 | B1 * | 8/2020 | Abou Shousha ........ A61B 3/14 |
| 11,039,745 | B2 * | 6/2021 | Abou Shousha .... A61B 3/0025 |
| 2009/0033863 | A1 | 2/2009 | Blum et al. |
| 2009/0204207 | A1 | 8/2009 | Blum et al. |
| 2012/0194780 | A1 | 8/2012 | Back |
| 2013/0242253 | A1 | 9/2013 | Blum et al. |
| 2015/0277151 | A1 | 10/2015 | Yadin et al. |
| 2017/0160440 | A1 | 6/2017 | Yadin et al. |
| 2018/0168444 | A1 | 6/2018 | Foss |
| 2019/0094552 | A1 | 3/2019 | Shousha |
| 2020/0285062 | A1 | 9/2020 | Grutman et al. |
| 2021/0304685 | A1 * | 9/2021 | Nicholson .......... G02B 27/0093 |

FOREIGN PATENT DOCUMENTS

| | | |
|---|---|---|
| WO | 2012/034265 A1 | 3/2012 |
| WO | 2015/124574 | 8/2015 |
| WO | 2018/055618 A1 | 3/2018 |

OTHER PUBLICATIONS

Search Report dated Sep. 25, 2020 and prepared by the UK Intellectual Property Office for GB2005040.7, which s the Paris Convention Treaty priority application of the instant application.

* cited by examiner

METHOD AND DEVICE FOR TREATING VISION IMPAIRMENT

RELATED APPLICATION

The present application gains priority from UK patent application GB 2005040.7 filed 6 Apr. 2020, which is included by reference as if fully set-forth herein.

FIELD AND BACKGROUND OF THE INVENTION

The invention, in some embodiments, relates to the field of ophthalmology and, more particularly but not exclusively, to optical devices useful for non-invasive treatment of vision impairments.

In the art, it is known to modify an image formed on the retina of an eye to treat a vision impairment.

U.S. Pat. No. 7,832,859 (Auckland Uniservices Ltd.) and US 2012-0113386 and U.S. Pat. No. 8,899,746 (both to Coopervision International Holding Company) all teach contact lenses that modify the image formed on the retina of an eye for preventing and/or reducing the progression of myopia and/or hyperopia.

WO 2018/055618 to the Applicant and U.S. Pat. No. 10,251,546 to Nottingham University teach treatment for amblyopia of a subject having an amblyopic eye and a non-amblyopic eye by modifying an image displayed to the non-amblyopic eye, specifically, degrading at least part of the image so that the amblyopic eye is forced to be used.

US 2019/0200858 to the Applicant teaches display of a modified image to a person suffering from vision impairment due to macular damage to treat the eye.

The methods and devices disclosed in these and other art have one or more disadvantages for treating vision impairments. It would be useful to have methods and devices that have at least one advantage over the art.

SUMMARY OF THE INVENTION

Some embodiments of the invention herein relate to devices useful in the field of ophthalmology and, in some particular embodiments, useful for the non-invasive treatment of various vision impairments. Some embodiments of the teachings herein are useful for one or more of: preventing the development, stopping the progression, reducing the severity of existing visual deficits and improving the quality of life in cases such as refractive errors including myopia, hyperopia and anisometropia; vision degeneration caused by macular degeneration; and amblyopia.

According to an aspect of some embodiments of the teachings herein, there is provided a wearable optical device for a human subject, comprising:
 a. a transparent lens having a distal surface and a proximal surface;
 b. a wearable frame configured, when worn by a human subject, to maintain the proximal surface of the lens in front of a first eye of the subject at a distance of not less than 5 mm and not more than 50 mm from the surface of the cornea of the first eye so that at least part of the visual field of the first eye is covered by the lens when the gaze direction of the first eye is straight ahead;
 c. a transparent pixelated active optical element comprising at least 100 independently-addressable pixels, each one of the pixels having an optical property with a changeable value, the active optical element physically associated with the frame and/or the lens so that at least part of the visual field of the first eye is covered by both the lens and the active optical element;
 d. an eye tracker configured to determine and report the gaze direction of the first eye; and
 e. a controller having a digital memory configured to:
  i. receive from the eye-tracker a determined gaze direction of the first eye; and
  ii. at a repetition rate, set a value for the optical property of the at least 100 pixels of the active optical element so as to create an image mask (using the active optical element) through which at least some of the light reaching the first eye passes through, thereby modifying the image formed on the retina of the first eye,
wherein the value for the optical property is based on a received gaze direction and the optical power of the lens, and
wherein the controller, the lens and the active optical element are together configured so that during operation of the optical device, at least a portion of the visual field of the first eye is degraded by the optical power of the lens and/or by the image mask.

In some such embodiments, the optical device further comprises: a pupil size determiner configured to determine and report the size of the pupil of the first eye, and the controller is configured to receive from the pupil size determiner a determined pupil size of the first eye, and the value for the optical property of the pixels is also based on a received pupil size.

According to an aspect of some embodiments of the teachings herein, there is also provided a wearable optical device for a human subject, comprising:
 a. a transparent lens having a distal surface and a proximal surface;
 b. a wearable frame configured, when worn by a human subject, to maintain the proximal surface of the lens in front of a first eye of the subject at a distance of not less than 5 mm and not more than 50 mm from the surface of the cornea of the first eye so that at least part of the visual field of the first eye is covered by the lens when the gaze direction of the first eye is straight ahead;
 c. a transparent pixelated active optical element comprising at least 100 independently-addressable pixels, each one of the pixels having an optical property with a changeable value, the active optical element physically associated with the frame and/or the lens so that at least part of the visual field of the first eye is covered by both the lens and the active optical element;
 d. an eye tracker configured to determine and report the gaze direction of the first eye; and
 e. a controller having a digital memory configured to:
  i. receive from the eye-tracker a determined gaze direction of the first eye; and
  ii. at a repetition rate, set a value for a the optical property of the at least 100 pixels of the active optical element so as to create an image mask (using the active optical element) through which at least some of the light reaching the first eye passes through, thereby modifying the image formed on the retina of the first eye,
wherein the value for the optical property is based on a received gaze direction and the optical power of the lens, and
wherein the optical device further comprises:
 a pupil size determiner configured to determine and report the size of the pupil of the first eye, and the controller is configured to receive from the pupil size determiner a determined pupil size of the first eye, and the value for the optical property of the pixels is also based on a received pupil size.

In some such embodiments, the controller, the lens and the active optical element are configured so that during operation of the optical device, at least a portion of the visual field of the first eye is degraded by the optical power of the lens and/or by the image mask.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Figure 1A:
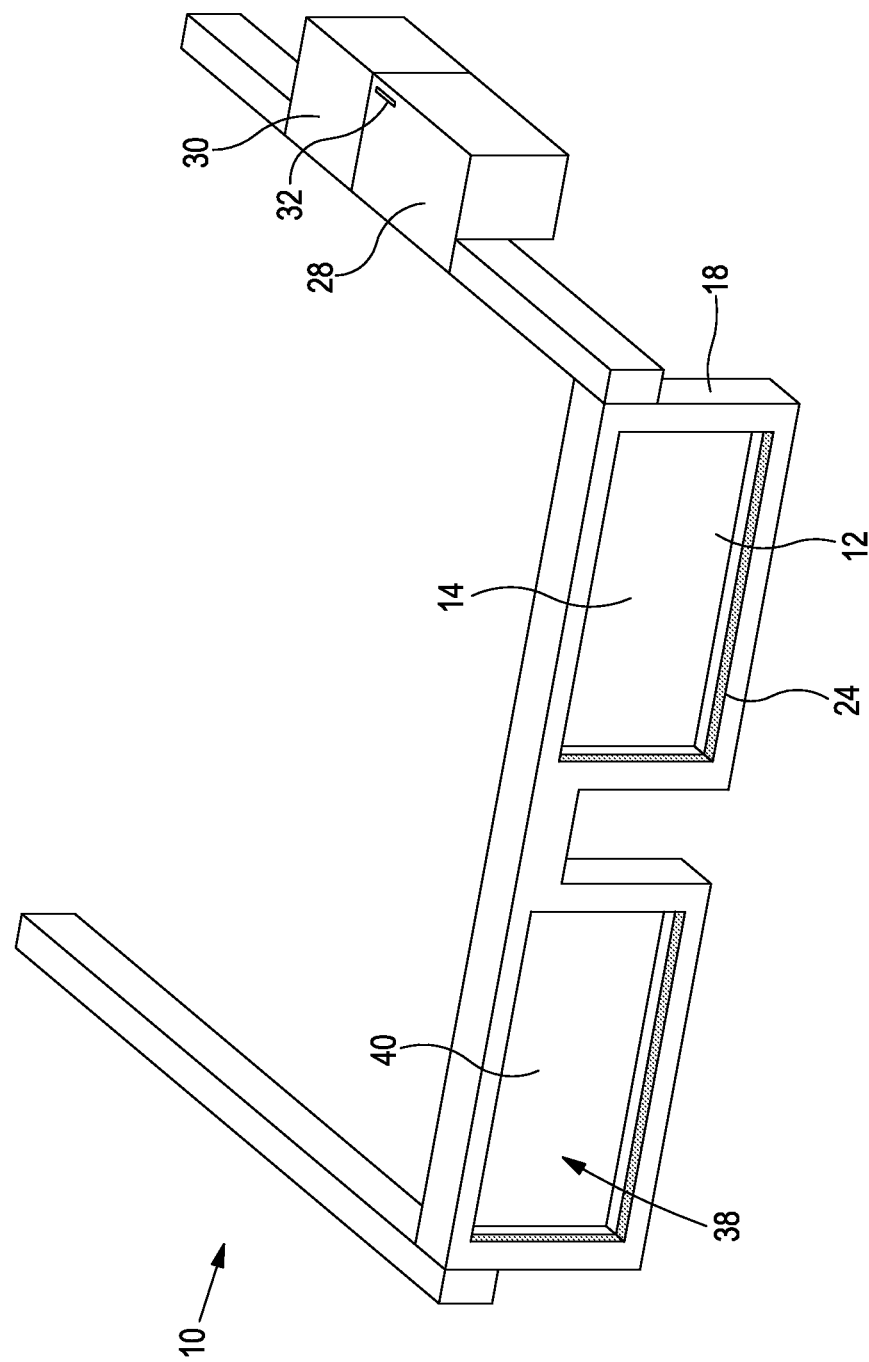
FIGS. 1A-1C are schematic depictions of an exemplary embodiment of an optical device according to the teachings herein with reference to in perspective view from the front (FIG. 1A), in view from the back (FIG. 1B) and in top view (FIG. 1C) having a single active optical element with a visual field that is equal to that of the associated lens.

Some embodiments of the invention herein relate to devices useful the field of ophthalmology and, in some particular embodiments, useful for the non-invasive treatment of various vision impairments.

Herein is disclosed a wearable optical device, which in some preferred embodiments resembles eyeglasses. The wearable optical device includes at least one transparent pixelated active optical element associated with a lens, the active optical element configured to create an image mask through which light passes before reaching the eye of the person wearing the optical device. The light passes through both the lens and the image mask, so that the image formed on the retina of the eye is modified by the image mask. In embodiments where the lens is a refracting lens having a non-zero optical power, the image formed on the retina of the eye is modified by the image mask and the refracting lens.

The image mask is created in such a way so that the image formed on the retina has some utility in the treatment of a vision impairment. For example, in some embodiments the image formed helps the subject wearing the optical device see better, that is to say, an effect of a vision impairment is ameliorated. In some preferred embodiments, the image formed is a therapeutic image which is configured to affect a persistent change in how the brain perceives input from the eye and/or to stimulate an actual physical change in the eye itself. It has been found that in some preferred embodiments, for the formed image to have the desired utility, at least a portion of the visual field of the eye is degraded by the optical power of the lens and/or by the image mask.

In some embodiments, the lens is a plano lens, the active optical element is a tunable lens (where a changeable optical property of the pixels allows the active optical element to change the optical power of the active optical element) and a desired image mask is created so that the active optical element acts as a lens to form the desired image on the retina.

In some embodiments, the lens is a refractive lens, the active optical element is a tunable lens and a desired image mask is created based on the optical power of the lens so that the active optical element acts as an additional lens together with the lens to form the desired image on the retina. The image mask is also created based on the gaze direction as determined by an eye tracker. Some such embodiments can be considered as maintaining the image mask at the same position relative to the gaze direction of the eye. In such a way, the image mask is created to ensure that an image-modification is continuously located on the correct location of the retina.

As known in the art, the size of the pupil effects how incoming light is refracted onto the retina. For example, it is known that under equal parameters, a larger pupil size leads to a less sharp image formed on the retina compared to a smaller pupil size. To account for this, in some embodiments, the image mask is created also based on pupil size as determined by a pupil size determiner to ensure that a desired image is formed on the retina. In some such embodiments, the exact image mask that is created accounts for ray tracing that is dependent on the determined pupil size.

It is herein disclosed that a wearable optical device according to the teachings herein can be used for non-invasive treatment of various vision impairments, in some embodiments useful for one or more of: preventing the development, stopping the progression, reducing the severity of extant vision impairments and improving the quality of life such as refractive errors including myopia, hyperopia and anisometropia; vision degeneration caused by macular degeneration; and amblyopia.

Figure 1B:
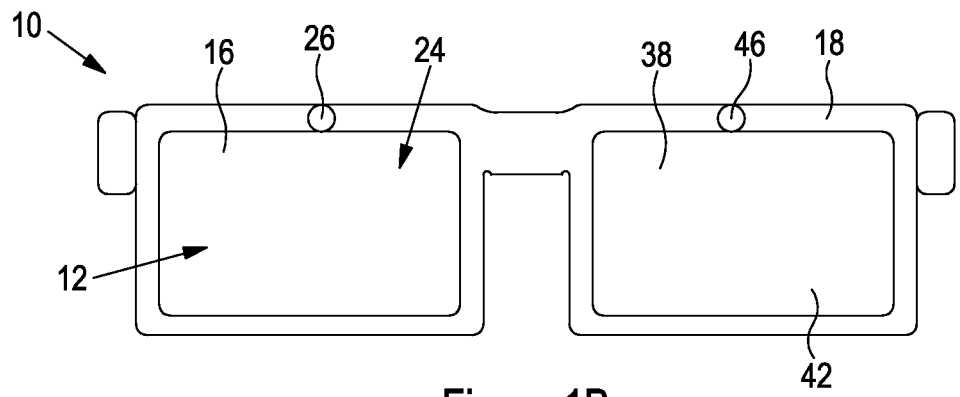
Figure 1C:
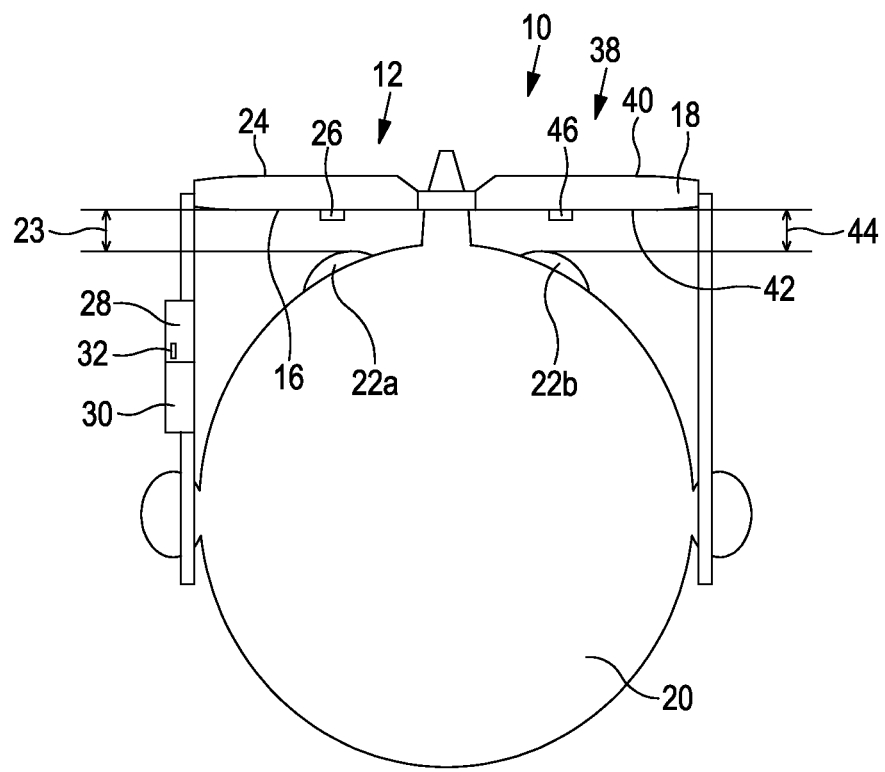

An exemplary embodiment of a wearable optical device according to the teachings herein, optical device 10 is schematically depicted in FIG. 1A (perspective view from the distal side), FIG. 1B (view from the back toward the proximal side) and FIG. 1C (view from the top). According to an aspect of some embodiments of the teachings herein, there is provided a wearable optical device 10 for a human subject, comprising:

a. a transparent lens 12 having a distal surface 14 and a proximal surface 16;

b. a wearable frame 18 configured, when worn by a human subject 20, to maintain proximal surface 16 of lens 12 in front of a first eye 22a of subject 20 at a distance 23 of not less than 5 mm and not more than 50 mm from the surface of the cornea of first eye 22*a* so that at least part of the visual field of first eye 22*a* is covered by lens 12 when the gaze direction of first eye 22*a* is straight ahead;

c. a transparent pixelated active optical element 24 comprising at least 100 independently-addressable pixels, each one of the pixels having an optical property with a changeable value, active optical element 24 physically associated with frame 18 and/or lens 12 so that at least part of the visual field of the first eye 22*a* is covered by both lens 12 and active optical element 24, d. an eye tracker 26 configured to determine and report the gaze direction of first eye 22*a*; and e. a controller 28 having a digital memory configured to:
  i. receive from eye-tracker 26 a determined gaze direction of first eye 22*a*; and
  ii. at a repetition rate, set a value for the optical property of the at least 100 pixels of the active optical element 24 so as to create an image mask through which at least some of the light reaching first eye 22*a* passes through, thereby modifying the image formed on the retina of first eye 22*a*, wherein the value for the optical property is based on a received gaze direction and the optical power of lens 12.

In device 10, controller 28, lens 12 and active optical element 24 are together configured so that during operation of device 10, at least a portion of the visual field of first eye 22*a* is degraded by the optical power of lens 12 and/or by the image mask.

In optical device 10, eye tracker 26 is also configured to function as pupil size determiner to determine and report the size of the pupil of first eye 22*a*, and controller 28 is also configured to receive such a determined pupil size and to set a value for the optical property of the pixels also based on the received pupil size.

In device 10 depicted in FIGS. 1A-1C, active optical element 24 is positioned before lens 12 in intimate contact with distal surface 14, where the visual field of active optical element 24 is equal to that of lens 12. As a result, it is difficult to discern the exact location of active optical element 24 and lens 12 in FIGS. 1B and 1C. In FIG. 1A, the edge of active optical element 24 meeting frame 18 is marked in grey color.

Power Supply

Some components of the optical device require electrical power for operation, for example, the active optical element, the controller, the eye tracker and, where present, the pupil size determiner. Any suitable power supply can be used to provide the required electrical power.

In some embodiments, the optical device comprises a holder in which a power supply such as batteries (preferably but not necessarily rechargeable) can be reversibly placed.

Alternatively or additionally, in some embodiments, the optical device comprises an integral electrical power supply for providing electrical power for operation of components, e.g., integral rechargeable batteries.

Alternatively or additionally, in some embodiments, the optical device comprises an input for accepting electrical power for operation of components from an external electrical power supply. For example, in some embodiments, the optical device comprises an input such as a port, e.g., a USB port which can accept power from an external power source.

Optical device 10 depicted in FIGS. 1A-1C includes an integral rechargeable battery 30 as an electrical power source which can be recharged via a USB port 32. USB port 32 is also functional for data transfer to and from controller 28.

Frame

As noted above, an optical device according to the teachings herein comprises a wearable frame configured, when worn by a human subject, to maintain the proximal surface of the lens in front of a first eye of a subject at a distance of not less than 5 mm and not more than 50 mm from the surface of the cornea of the first eye so that at least part of the visual field of the first eye is covered by the lens when the gaze direction of first eye is straight ahead.

As used herein, the phrase "at least part of the visual field of the first eye is covered by the lens" and similar such phrases mean that at least some light entering the eye through the visual field thereof passes through the lens.

The wearable frame is any suitable wearable frame that supports the lens in the position as described above. Typically, the lens is physically associated with the frame. In some preferred embodiments, the wearable frame is an eyeglasses frame, having a bridge configured to rest on the nose of the subject and arms to rest behind the ears of the subject. optical device 10 depicted in FIGS. 1A-1C comprises a wearable frame 18 that is an eyeglasses frame that includes a bridge and two arms. Other, non-depicted, embodiments of an optical device according to the teachings herein have other frames.

Transparent Lens

An optical device according to the teachings herein comprises a transparent lens having a distal surface and a proximal surface. By "transparent" is meant that the lens allows enough light reflected from an object to pass through the lens so that the object can be distinctly seen.

Plano Lens

In some embodiments, the lens is a plano lens as known in the art, has no optical power.

Refracting Lens

In some embodiments, the lens is a refracting lens having a non-zero optical power, thereby configured to refract light passing therethrough.

In some such embodiments, the refracting lens is configured to at least partially correct refractive errors in at least part of the visual field of the first eye of the subject for which the optical device is intended. Additionally or alternatively, in some such embodiments, the refracting lens is configured to degrade at least a portion of the visual field of the subject for which the optical device is intended.

In some such embodiments, the lens is a simple monofocal refracting lens having a single constant optical power over the entire lens. Alternatively, in some such embodiments the lens is a complex refracting lens, having at least two portions, each having a different optical power (e.g., bifocal, multifocal or progressive lens), for example, a portion for near-vision and a different portion for far-vision. In some embodiments, the lens has at least two different portions configured to provide a therapeutic effect. For example, in some embodiments configured for treatment of myopia a first central portion of the lens is configured to focus light on the retina of the subject and a second peripheral portion of the lens is configured so as not to focus light on the retina of the subject. The utility of such an embodiment is discussed hereinbelow in greater detail.

The lens is any suitable size. In some embodiments, the frame and lens are together configured so that at least 30% of the visual field of the first eye is covered by the lens when the gaze direction of the first eye is straight ahead. In some embodiments, at least 40%, at least 50%, at least 60% and even at least 70% of the visual field of the first eye is covered by the lens when the gaze direction to the first eye is straight ahead. In preferred embodiments, the lens covers at least 70% of the visual field in the primary gaze.

Active Optical Element

An optical device according to the teachings herein comprises a transparent pixelated active optical element comprising at least 100 independently-addressable pixels, each one of the pixels having an optical property with a changeable value, the active optical element physically associated with the frame and/or the lens so that at least part of the visual field of the first eye is covered by both the lens and the active optical element. By "transparent" is meant that the active optical element has at least one state that allows enough light reflected from an object to pass through the optical element so that the object can be distinctly seen. As used herein, the phrase "at least part of the visual field of the first eye is covered by both the lens and the active optical element" and similar such phrases mean that at least some light entering the eye passes through both the lens and the active optical element.

In some embodiments, the active optical element is secured to a surface of the lens. In some such embodiments, the active optical element is secured to the distal surface of the lens. In some embodiments, the active optical element is secured to the proximal surface of the lens. In some embodiments, the lens and the active element are combined to be one element without any physical separation between the two.

Figure 2A:
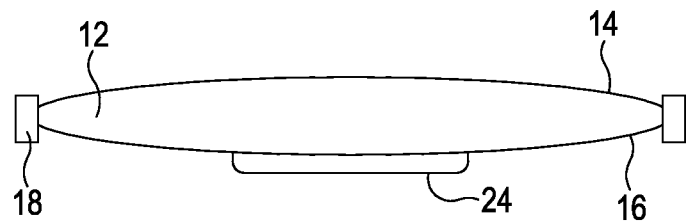
FIGS. 2A-2D depict different embodiments of how an active optical element is associated with a lens of an optical device according to the teachings herein.

In FIG. 2A, a lens 12 is depicted in cross section with an active optical element 24 secured to a proximal surface 16 of lens 12. In FIG. 2A, the part of the visual field of an eye that is covered by both lens 12 and active optical element 24 is smaller than the part of the visual field of the eye that is covered by lens 12.

Figure 2B:
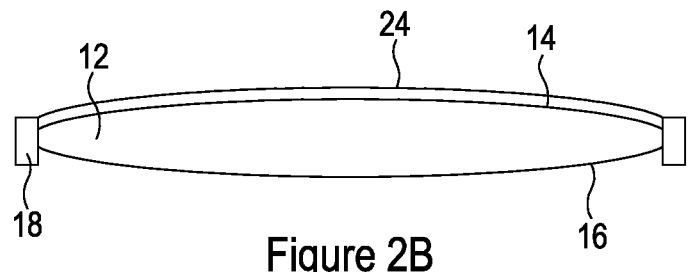

In FIG. 2B, a lens 12 is depicted in cross section with an active optical element 24 secured to a distal surface 14 of lens 12. In FIG. 2B, the part of the visual field of an eye that is covered by both lens 12 and active optical element 24 is the same as the part of the visual field of the eye that is covered by lens 12.

Figure 2C:
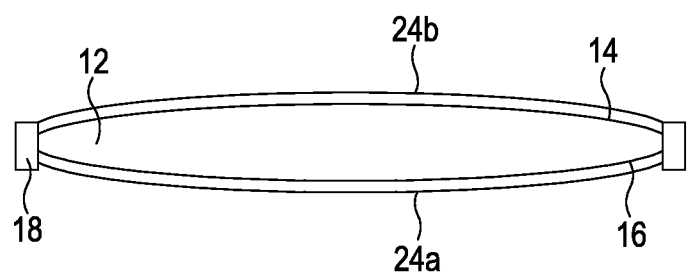

In FIG. 2C, a lens 12 is depicted in cross section with a first subcomponent 24a of the active optical element secured to a proximal surface 16 of lens 12 having pixels where the optical property with a changeable value is light transmission and a second subcomponent 24b of the active optical element 24 secured to a distal surface 14 of lens 12 having pixels where the optical property with a changeable value is a property of the pixels that provides controllable optical power of the active optical element. In FIG. 2C, the part of the visual field of an eye that is covered by both lens 12 and active optical element 24 is the same as the part of the visual field of the eye that is covered by lens 12.

Figure 2D:
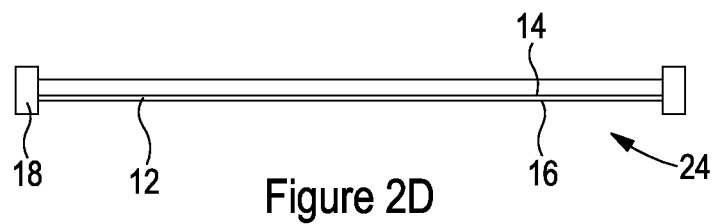

In FIG. 2D, is depicted in cross section a lens 12 which is one of the components of an active optical element 24, specifically, the backing component that supports other parts of active optical element 24.

Shape of the Active Optical Element

The active optical element has any suitable shape.

In some embodiments, the active optical element is circular. In optical device 10 depicted in FIGS. 1A-1C, active optical element 24 is rectangular.

Figure 3:
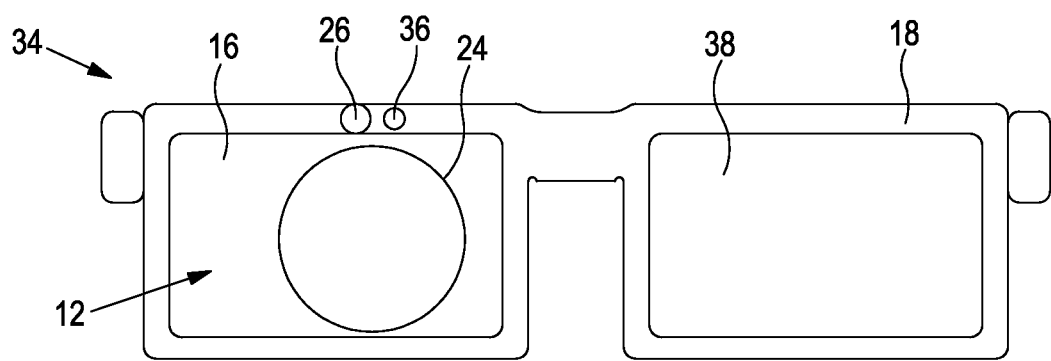
FIG. 3 is a schematic depiction of an exemplary embodiment of an optical device according to the teachings herein from the back having an active optical element with a visual field that is smaller than that of the associated lens.

In an optical device 34 depicted in FIG. 3, active optical element 24 is circular.

Number of Pixels

The number of pixels is any suitable number of independently-addressable pixels. Although the active optical element comprises at least 100 independently-addressable pixels, it is generally preferred that the active optical element comprises more than 100 independently-addressable pixels, in some embodiments, at least 800, at least 1600 and even at least 3200 individually addressable pixels.

Coverage of the Visual Field

The active optical element is physically associated with the frame and/or the lens so that at least part of the visual field of the first eye is covered by both the lens and the active optical element. In some embodiments, the visual field of the active optical element is the same size as that of the lens, so the part of the visual field of the first eye that is covered by both the lens and the active optical element is the same, as in device 10 depicted in FIGS. 1A-1C. In some alternate embodiments, the visual field of the active optical element is smaller than that of the lens so that the part of the visual field of the first eye that is covered by both the lens and the active lens is smaller than the part of the visual field of the first eye that is covered by the lens, as in device 34 depicted in FIG. 3. In some embodiments, the part of the visual field of the first eye that is covered by both the lens and the active optical element when the gaze direction of the first eye is straight ahead is at least 20%, at least 30%, at least 40%, at least 50% and even at least 60%.

In some embodiments, the visual field of the first eye is alternately covered by the lens and the active optical element when the gaze direction of the first eye is straight ahead. In some embodiments, the central visual field of the first eye is covered by the lens and the rest of the visual field is alternately covered by the lens and the active optical element when the gaze direction of the first eye is straight ahead Optical Property with Changeable Value The optical property having a changeable value can be any suitable optical property. In some embodiments, the optical property with a changeable value is selected from the group consisting of:

a property of the pixels that provides controllable optical power for the active optical element;

light transmission of the pixels; and both a property of the pixels that provides controllable optical power for the active optical element and light transmission of the pixels.

Controllable Optical Power

In some embodiments, an optical property of the pixels having a changeable value is a property of the pixels that provides controllable optical power for the active optical element under control of the controller.

In such embodiments, the active optical element can be considered a tunable lens which optical power can be changed by changing some property (e.g., index of refraction, dimensions) of the individual pixels. In some embodiments, changing optical power includes tuning the active optical element to be a simple lens having a fixed optical power over the entire active optical element. In some embodiments, changing optical power includes tuning the active optical element to be a complex lens having at least two portions, each having a different optical power.

As noted above, the active optical element is physically associated with the frame and/or the lens so that at least part of the visual field of the first eye is covered by both the lens and the active optical element. Light passing through the part of the visual field that is covered by both the lens and the active optical element is refracted by both the constant optical power of the lens and the changeable optical power of the active optical element.

Any suitable technology or combinations of technologies may be used to implement such embodiments, for example, using tunable lenses similar to or identical to the described in U.S. Pat. Nos. 7,475,985; 10,036,901; 10,466,391, US 2020/0003933 and references cited therein.

Changeable Light Transmission

In some embodiments, an optical property of the pixels having a changeable value is light transmission of the pixels which is changeable for each pixel under control of the controller. Any suitable technology or combinations of technologies can be used to implement such an embodiment, for example, that each one of the pixels comprises an LCD pixel of a prior art transparent LCD display where the degree of light transmission can be controlled by the controller to transmit more light (a more transparent pixel that allows high light transmission) or less light (a less transparent, darker, pixel that reduces light transmission). Suitable such active optical elements are similar to displays available from Crystal Display Systems Ltd. Rochester, Kent, UK.

As noted above, the active optical element is physically associated with the frame and/or the lens so that at least part of the visual field of the first eye is covered by both the lens and the active optical element. Light passing through the part of the visual field that is covered by both the lens and the active optical element is refracted by the optical power of the lens but the intensity of the light is altered by the changeable light transmission of the pixels of the active optical element.

Both Changeable Refractivity and Light Transmission

In some embodiments, the optical property of the pixels of the active optical elements that are changeable are both a property of the pixels that provides controllable optical power for the active optical element and light transmission. An exemplary such embodiment is device 34 depicted in FIG. 3.

Controller

An optical device according to the teachings herein comprises a controller having a digital memory configured to:
  receive from the eye-tracker a determined gaze direction of the first eye; and
  at a repetition rate, to set a value for the optical property of the at least 100 pixels of the active optical element so as to create an image mask through which at least some of the light reaching the first eye passes through, thereby modifying the image formed on the retina of the first eye, wherein the value for the optical property is based on a received gaze direction and the optical power of the lens. In some embodiments, the optical device also comprises a pupil size determiner that is configured to determine and report the size of the pupil of the first eye, and the controller is configured to receive from the pupil size determiner a determined pupil size of the first eye and to set a value for the optical property of the pixels also based on the received pupil size.

The controller is typically a computation device, general purpose or custom, that is configured (e.g., using software, hardware, firmware, or a combination thereof) to receive a determined gaze direction, recover parameters from the digital memory (e.g., the optical power of the lens), calculate a required image mask, and send the required commands to the pixels of the active optical elements to create the image mask. In some embodiments, especially embodiments where the active optical element is considered a tunable lens, calculations of a required image mask include optical design and/or ray tracing calculations to account for factors such as the optical power of the lens (especially when the lens is a refracting lens, especially a complex refracting lens) and pupil size. Any suitable optical design and/or ray tracing calculations can be used, for example, calculations performed using commercially-available software such as available from Zemax LLC (Kirkland, Wash., USA).

In preferred embodiments, the controller includes at least one component for data exchange with other devices, for example, to allow updating of the controller. Such a component can include a physical port (e.g., a USB port) or a wireless communication component, e.g., a Bluetooth® transceiver.

The optical device according to the teachings herein is preferably configured to be useful for non-invasive treatment of various vision impairments. The treatment is affected by modifying the image that is produced on the retina of an eye which modification is done by the image mask created using an active optical element alone or together with a refracting lens. Depending on the embodiment and the specific image mask, the treatment can include one or more of:
  preventing the development of a vision impairment;
  slowing down, stopping and/or preventing the progression of an extant vision impairment;
  reducing the severity of an extant vision impairment;
  ameliorating the negative effects of an extant vision impairment; and
  improving the quality of life of a subject having a vision impairment.

Vision impairments that can be treated by one or more embodiments of the teachings herein include, but are not limited to:
  refractive errors including myopia, hyperopia and anisometropia;
  vision impairments caused by macular degeneration; and
  amblyopia.

As detailed hereinbelow, the image mask modifies the image formed on the retina of the first eye, thereby treating a vision impairment. In embodiments where the lens is a plano lens, the image mask alone modifies the image formed on the retina. In alternative embodiments where the lens is a refracting lens having a non-zero-optical power, the image mask and the lens operate together to modify the image formed on the retina.

In some embodiments, the controller is configured to create an image mask having a portion that amplifies an image modification done by a corresponding lens, for example, to increase the magnitude of the optical power of a portion of the lens that has optical power.

In some embodiments, the controller is configured to create an image mask having a portion that decreases an image modification done by a corresponding lens, for example, to decrease the optical power of a portion of the lens that has a positive optical power, or to decrease the optical power of a portion of the lens that has a negative optical power. For example, in some embodiments the lens is configured to degrade at least a portion of the visual field of the eye by blurring a portion of an image formed on the retina to achieve a therapeutic effect and in some such embodiments, an image mask is created to counter a portion of the blurring by sharpening some of the image. In another example, in some embodiments the lens is configured to sharpen a portion of an image formed on the retina to achieve a therapeutic effect and in some such embodiments, an image mask is created to counter a portion of the sharpening by blurring some of the image.

In preferred embodiments, as discussed in greater detail below, the modification of an image that is formed on the retina of an eye by an active optical element (and, in some embodiments, also an associated refracting lens) leads to degradation of at least part of the image. Accordingly, in some embodiments, the controller, the lens and the active optical element are together configured so that during operation of the optical device, at least a portion of the visual field of the first eye is degraded by the optical power of the lens and/or by the image mask. In some embodiments, the created image mask is such that the modifying of the image formed on the retina of the first eye is such that at least some of the image is degraded. In some embodiments, where the lens is a refracting lens that is configured to degrade at least a portion of the visual field of the first eye of the subject, the created image mask is such that the modifying of the image formed on the retina of the first eye counters at least some of the degradation caused by the first lens.

In some embodiments, the image mask is created in such a way so that the image formed on the retina is a therapeutic image which is configured to affect a persistent change in how the brain perceives input from the eye and/or to stimulate an actual physical change in the eye itself as opposed to simply providing an instantaneous better image. Such persistent changes include:

- effecting physical eyeball growth to prevent development or stop the progression of myopia;
- encouraging the development of a persistent pseudofovea to alleviate vision loss due to macular degeneration; and
- encouraging the use of an amblyopic eye over a non-amblyopic eye to cause a persistent change in the way the brain perceives images received from the amblyopic eye to improve the visual deficits of the amblyopic eye and to improve binocularity.

A controller is configured to calculate a required image mask based on the determined gaze direction of the first eye received from the eye tracker; the optical power of the lens, and in some embodiments also the determined pupil size of the first eye received from the pupil size determiner. The controller then creates a calculated image mask pattern using the active optical element by setting a value for the changeable optical property of the pixels of the active optical element. The required image mask that is calculated and created by the controller is an image mask through which at least some of the light reaching the first eye passes, modifying the image formed on the retina of the first eye. The modified image providing the desired treatment.

In preferred embodiments, the modification of the image falling on the retina is constant in the frame of reference of the eye, that is to say, the modification of the image moves according to the gaze direction of the eye. For example, in an exemplary embodiment the controller creates a mask that ensures that light that reaches the fovea of the eye of the subject is always focused. In such an example, at each moment in time the properties of the pixels of the active optical element are set so that the instantaneously-formed optical mask, together with the lens, focus light on the fovea. To an external observer it seems that the same image mask is moving on the active optical element in coordination with the gaze direction as the eye moves, so that the image mask is maintained at the same position relative to the gaze direction of the first eye.

Accordingly, in preferred embodiments, two succeeding image masks (two image masks where one is created immediately after the other) created based on two respective received gaze directions are created so that the modifying of an image formed on the retina of the first eye by the two succeeding images is substantially the same. In this context, "substantially the same" means that two succeeding image masks are sufficiently similar or identical to provide the same treatment for the eye.

In embodiments where the lens is a plano lens, the modification of light reaching the first eye is exclusively due to the image mask. In embodiments, where the lens is a simple refracting lens having a single focal optical power over the entire lens, the modification of light reaching the first eye is a combination of the effect of the image mask and the lens. In some such embodiments, the controller can be considered as moving the same mask on the active optical element so that substantive portions of the mask are always positioned in the same position relative to the gaze direction (and fovea) of the eye. Thus, in some embodiments where the lens is a plano lens or where the lens is a simple refracting lens having a single focal optical power over the entire lens, two succeeding image masks created based on two respective received gaze directions are substantially the same relative to the respective gaze directions, so that the two succeeding image masks are positioned at a constant location relative to the gaze direction of the first eye.

In embodiments where the lens is a complex refracting lens having at least two portions, each having a different optical power, the modification of light reaching the first eye is a combination of the effect of the image mask and the lens. In some such embodiments, the controller creates the optical mask so that modification of the image that reaches the retina remains the same, which requires that each mask be created accounting also for the optical power of the lens relative to the gaze direction. In such embodiments, two succeeding mask may be substantially different, for example, in a situation where an earlier mask is created when the gaze direction is directed through a portion of the lens having a first optical power and the succeeding mask is created when the gaze direction is directed through a portion of the lens having a second, substantially different, optical power. Thus, in some embodiments where the lens is a complex refracting lens having at least two portions, each having a different optical power, two succeeding image masks created based on two respective received gaze directions are such that the modification of an image that reaches the retina remains the same.

In some embodiments, an additional factor that is accounted for by the controller when calculating a required image mask is pupil size. As is known to a person having ordinary skill in the art, the size of an optical aperture influences the image formed on a given image plane. In the context of the teachings herein, the pupil size (the aperture) which varies, inter alia, as a result of ambient illumination conditions, vergence or distance to a viewed object influences the image formed on the retina (the image plane). Accordingly, in preferred embodiments, the controller also accounts for the pupil size when calculating and creating an image mask so that two succeeding image masks created based on two respective received pupil sizes are such that the modification of an image that reaches the retina remains the same.

Other Parameters

In some embodiments parameters other than a determined gaze direction, lens optical power and pupil size are used by the controller to create an image mask. The other parameters can be stored parameters and/or measured parameters and are discussed in greater detail below.

Parameters stored by the controller and used to create an image mask can include none, one or more of:

- one or more image mask designs suitable for treatment of one or more conditions or different stages of the same treatment;
- formulae to calculate a required mask;
- clinical data of the subject intended to use the optical device (e.g., vision of one or both eyes, including visual acuity, refraction values of the eyes, ethnicity, age, map of retinal damage, retinal curvature, axial length, inter-pupillary distance);

optical power and other parameters of an optical device such as contact lens worn by the subject concurrently with wearing the optical device; and optical parameters of the lens (e.g., refraction distribution, prism aberrations), In some embodiments, the controller creates an image mask also to account for aberrations in the lens. For example, when the gaze direction of an eye is directed far from the lens optical power center (i.e., at a non-zero angle from straight ahead), light reaching the retina of the eye passes through lens aberrations which, in some embodiments, are compensated by the created image mask.

Parameters that are be measured, reported to the controller and used by the controller to create an image mask can include none, one or more of:

distance of the optical device from the user (Such embodiments typically include a distance determiner to determine distance of the optical device to a user and report to the controller. In some embodiments, the distance determiner is a separate distance-determining component (e.g., based on parallax, laser distance measurement, ultrasonic distance measurement). In some embodiments, the eye tracker is configured to also function as a distance determiner. In some embodiments, the controller is configured to calculate the distance of the optical device to the user from data provided by the eye tracker);

ambient illumination (Such embodiments typically include an ambient light intensity sensor to determine the intensity of ambient light and report to the controller. In some embodiments, the ambient light sensor is a separate light sensor component (e.g., based on a camera or photocell). In some embodiments, the eye tracker is configured to also function as an ambient light intensity sensor. In some embodiments, the controller is configured to calculate the ambient light intensity from data provided by the eye tracker);

vergence (Such embodiments typically include a vergence sensor to determine the vergence of the eyes and report to the controller. In some embodiments, the vergence sensor is a separate vergence sensing component (e.g., based on a camera). In some embodiments, the eye tracker is configured to also function as a vergence sensor. In some embodiments, the controller is configured to calculate the vergence from data provided by the eye tracker. In some embodiments, a measured vergence is used to calculate the viewing distance to an object that is being viewed); and range to a viewed object (Such embodiments typically include a range determiner to determine the range to an object viewed by the user and report to the controller. In some embodiments, the range determiner is a separate range-determining component (e.g., based on a camera (e.g., using parallax), laser rangefinder, ultrasound rangefinder).

In some embodiments, the controller is configured to create a given mask or a type of mask continuously, whenever the optical device is worn by the user. Additionally or alternatively, in some embodiments, the controller is configured to create a given mask or type of mask for a specific treatment for a limited time. In some embodiments, a time-limited treatment is environment-based, e.g., activated when reading (for example, by user selection or detection of range to an object viewed), activated when outside (for example, by user selection, detection of range to an object viewed), activated under specific light conditions (light or dark, for example, as detected by a light sensor). Additionally or alternatively, in some embodiments, a time-limited treatment is based on a schedule (e.g., based on clinical considerations as determined by a health-care professional, for example, one hour a day, 5 minutes an hour). Additionally or alternatively, in some embodiments the controller is configured to create a given mask or a type of mask for a specific treatment for a limited time based on the amount of power available in an associated power supply.

Modifying an image formed on the retina of an eye to treat a vision impairment has been disclosed previously but the optical device according to the teachings herein provides improvement to the state of the art. Depending on the specific embodiment, one or more advantages of the device according to the teachings herein include: no need for the subject to move the head to look at an object because the movement of the eyes relative to the head is compensated for by the active optical component; optical corrections can be changed according to momentary or temporary conditions such as pupil size, range to target, convergence; intensity of treatment can be adjusted with progress; there is automatic compensation for misalignments that occur in the production process or by how the subject wears the device; and potentially, a subject can wear the same device to treat amblyopia at a young age and myopia at a later age.

U.S. Pat. No. 7,832,859, US 2012-0113386 and U.S. Pat. No. 8,899,746 all teach contact lenses that modify the image formed in the retina of an eye for preventing and/or reducing the progression of myopia and/or hyperopia. Unlike such contact lenses, the teachings herein maintain the image-modifying element (the image mask created using the active optical element, in some embodiments also the lens) at a distance of not less than 5 mm and not more than 50 mm from the surface of the cornea of first eye. As can be demonstrated using ray tracing lens simulations, the retinal image formed by light passing through an image mask that is at a distance from the cornea is qualitatively different from the retinal image formed by light passing through a contact lens as described above.

Further, compared to such contact lenses, some embodiments of the optical device according to the teachings herein provides improved separation between central and peripheral images due to the distinct distance of the frame from the eye compared to contact lens position which is in contact with the cornea of the eye. The optical device is expected to achieve greater compliance as children might tend to reject insertion of a contact lens to the eye. Unlike the contact lens the optical element pattern can be dynamically adjusted according to changes such as in pupil size and viewing distance. Such contact lenses cannot compensate for different pupil sizes in contrary to the image formed on the retina by the optical element which qualitatively changes with pupil size while in preferred embodiments. Further, unlike an image mask created using an optical device according to the teachings herein, a retinal image formed by light passing through a contact lens changes as the contact lens moves relative to the cornea of the eye. Further, it is known in the art that wearing contact lenses might be uncomfortable and frightening for children, thereby lowering compliance. In addition, contact lens wear may cause eye infection and the natural movements of the contact lenses over the cornea of an eye might reduce treatment efficacy.

WO 2018/055618 to the Applicant teaches treatment of amblyopia of a subject having an amblyopic eye and a non-amblyopic eye by displaying on a display screen a modified image to the non-amblyopic eye, specifically, an image having low-quality portions to encourage use of the amblyopic eye. US 2019/0200858 to the Applicant teaches display of an image on a display screen to the eye of a subject suffering from macular vision damage to treat the eye. Both WO 2018/055618 and US 2019/0200585 teach a wearable vision aid based on a virtual reality device that includes a camera to acquire an image of the surroundings, a processor to modify an acquired image, and a display screen to display the modified image to the eye, the former to treat amblyopia the latter to treat macular vision damage. Such virtual reality devices isolates the user from the outside world which can be challenging for young children. In addition, the recommended age for using virtual reality devices is 12 years while treatment for amblyopia should start as early as possible in life. Importantly, such virtual reality devices are known to cause nausea, discomfort and distress after short period of time, so cannot be used continuously for a long period of time to treat children.

Eye Tracker and Mask Refresh Rate

An optical device according to the teachings herein comprises an eye tracker configured to determine and report the gaze direction of the first eye. Any suitable eye tracker can be used, for example, an eye tracker by Tobii AB (Danderyd, Sweden).

The eye tracker is configured to determine and report the gaze direction of the first eye (and, in some embodiments, the location of the eyes relative to the optical device and in some embodiments also the pupil size, see below) at any suitable rate. The controller receives the determined gaze direction and creates an image mask at any suitable rate.

In some embodiments, the eye-tracker is configured to determine and report the gaze direction of the first eye (and, in some embodiments, the location of the eyes relative to the optical device and/or in some embodiments also the pupil size) to the controller at a rate of not slower than 1 Hz; and the controller is configured to create a new image mask based on a received gaze direction at a repetition rate of not slower than 1 Hz. In preferred embodiments, the rate of determining is faster than 1 Hz, e.g., in some embodiments not slower than 2 Hz, not slower than 4 Hz, not slower than 8 Hz, not slower than 12 Hz, not slower than 20 Hz and even not slower than 30 Hz. In preferred embodiments, the repetition rate of creating an image mask is faster than 1 Hz, e.g., in some embodiments not slower than 2 Hz, not slower than 4 Hz, not slower than 8 Hz, not slower than 12 Hz, not slower than 20 Hz and even not slower than 30 Hz.

Pupil Size Determiner

In some embodiments, a pupil size determiner comprises a pupil size determiner configured to determine and report the pupil size of the first eye. Any suitable pupil size determiner can be used. Although in some embodiments a pupil-size determiner is a separate component, in preferred embodiments the eye tracker is also the pupil size determiner as most commercially-available eye trackers report pupil size concurrently with gaze direction.

In FIGS. 1B and 1C, optical device 10 comprises an eye tracker 26 that also functions as a pupil-size determiner, being configured to determine and report both gaze direction and pupil size of first eye 22a.

In FIG. 3, optical device 34 comprises an eye tracker 26 that is configured to determine and report gaze direction of a first eye and a separate pupil size determiner 36 that is configured to determine and report the pupil size of a first eye.

The pupil size determiner is configured to determine and report the pupil size of the first eye at any suitable rate. The controller receives the determined pupil size and creates an image mask also based on the received pupil size. Typically, but not necessarily, the pupil size determiner reports the pupil size at the same rate as the eye tracker reports the gaze direction.

In some embodiments of the optical device having an active optical element with changeable light transmission values for the pixels, especially some embodiments configured for treating anisocoria where the two pupils of the subject are of unequal size, the controller is configured to change the light transmission through one or two active optical elements to balance the intensity of light reaching the two eyes.

Second Lens

In the above description, some of the components of a wearable optical device according to the teachings herein that are discussed are a transparent lens, a wearable frame to maintain the lens in front of a first eye of the subject and a transparent pixelated active optical element physically associated the frame and/or lens so that at least part of the visual field of the first eye is covered by both the lens and the active optical element.

In some embodiments, the optical device is monocular, and the optical device does not comprise an optical component that is maintained in front of the second eye of the subject. In device 10 depicted in FIGS. 1A-1C and device 34 depicted in FIG. 3, there is a component indicated with 38. When component 38 is empty (that is to say, is absent or is opaque), the optical device is a monocular optical device.

In some embodiments, the transparent lens of the optical device discussed above is a first lens of the optical device, and the optical device further comprises:

a second transparent lens, a distal surface and a proximal surface; the wearable frame configured, when worn by the subject, to maintain the proximal surface of the second lens in front of the second eye of the subject at a distance of not less than 5 mm and not more than 50 mm from the surface of the cornea of the second eye so that at least part of the visual field of the second eye is covered by the second lens when the gaze direction of the second eye is straight ahead.

In some embodiments of optical device 10 depicted in FIGS. 1A-1C and optical device 34 depicted in FIG. 3, lens 12 is a first lens, and the optical device comprises a second transparent lens 38 having a distal surface 40 and a proximal surface 42; wearable frame 18 is configured, when worn by the subject, to maintain proximal surface 42 in front of a second eye 22b of subject 20 at a distance 44 of not less than 5 mm and not more than 50 mm from the surface of the cornea of second eye 22b so that at least part of the visual field of second eye 22b is covered by second lens 38 when the gaze direction of second eye 22b is straight ahead.

In some embodiments, the second lens is a plano lens. Alternatively, in some embodiments the second lens is a refracting lens having a non-zero optical power. In preferred embodiments, the second lens is configured to at least partially correct refractive errors of the second eye of the subject for which the optical device is intended.

The second lens is any suitable size. In some embodiments, the frame and the second lens are together configured so that at least 30% of the visual field of the second eye is covered by the second lens when the gaze direction of the second eye is straight ahead. In some embodiments, at least 40%, at least 50%, at least 60% and even at least 70% of the visual field of the second eye is covered by the second lens when the gaze direction to the second eye is straight ahead.

Tracking of Second Eye

In some embodiments, the optical device further comprises an eye tracker configured to determine the gaze direction of the second eye and to report a determined gaze direction to the controller. In some such embodiments, the eye tracker for determining the gaze direction of the first eye is also configured to determine and report the gaze direction of the second eye. In some embodiments, the optical device comprises a second eye tracker to determine and report the gaze direction of the second eye, the second eye tracker different from the eye tracker that is configured to determine and report the gaze direction of the first eye. In some such embodiments, the controller is configured to create the image mask for the first eye also based on the reported gaze direction of the second eye. In FIGS. 1A-1C, optical device 10 includes a second eye tracker 46 configured to determine and report the gaze direction of second eye 22b to controller 28.

Second Active Optical Element

In some embodiments, the transparent pixelated active optical element of the optical device discussed above is a first transparent pixelated active optical element of the optical device, and the optical device further comprises:

a second transparent pixelated active optical element comprising at least 100 independently-addressable pixels, each one of the pixels having an optical property with a changeable value, the second active optical element physically associated with the frame and/or the second lens so that at least part of the visual field of the second eye is covered by both the second lens and the second active optical element, and wherein the controller is further configured to:

iii. at a repetition rate, set a value for the optical property of the at least 100 pixels of the second active optical element so as to create an image mask through which at least some of the light reaching the second eye passes through, thereby modifying the image formed on the retina of the second eye, wherein the value for the optical property is based on a gaze direction of the second eye and the optical power of the second lens.

Figure 4A:
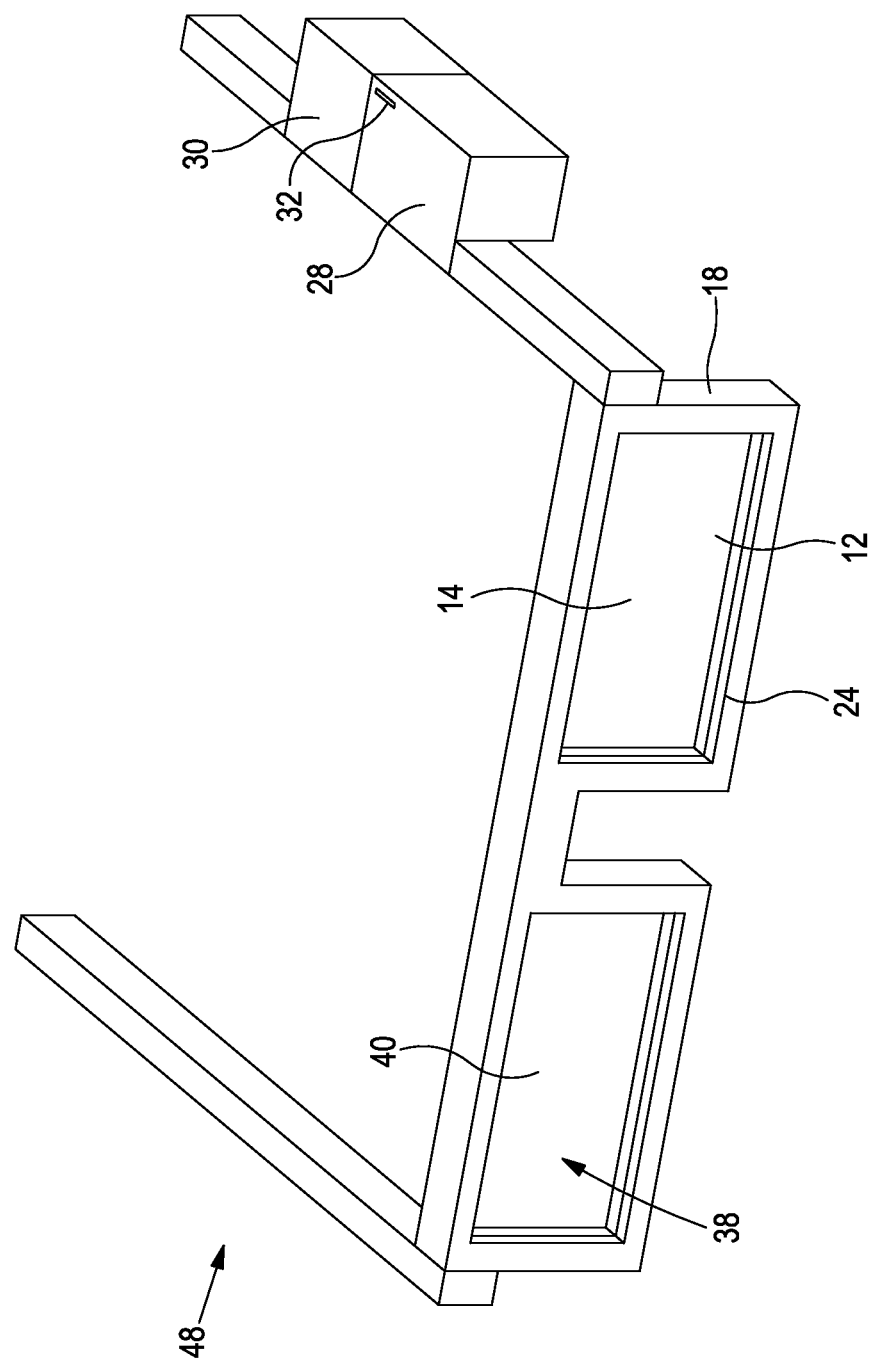
FIGS. 4A-4C are schematic depictions of an exemplary embodiment of an optical device according to the teachings herein in perspective view from the front (FIG. 4A), in view from the back (FIG. 4B) and in top view (FIG. 4C) having two active optical elements, one for each eye of a subject, each having a visual field that is equal to that of the associated lens.
Figure 4B:
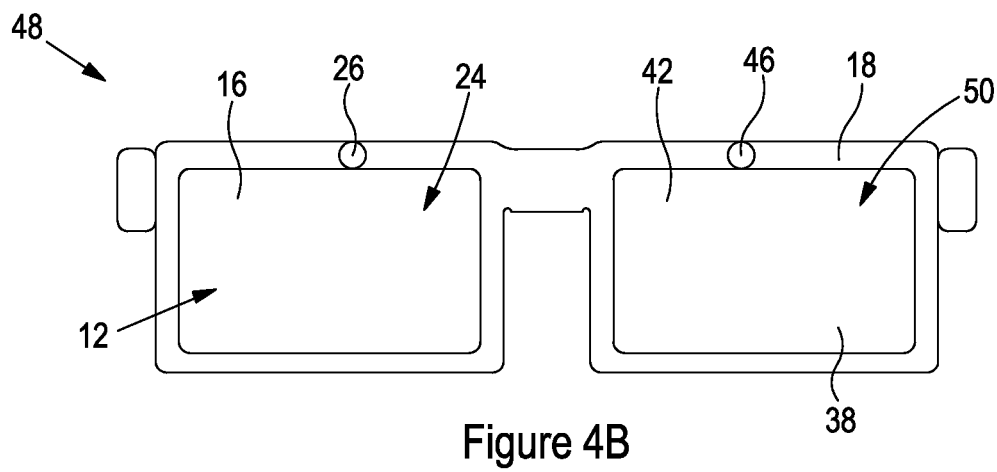
Figure 4C:
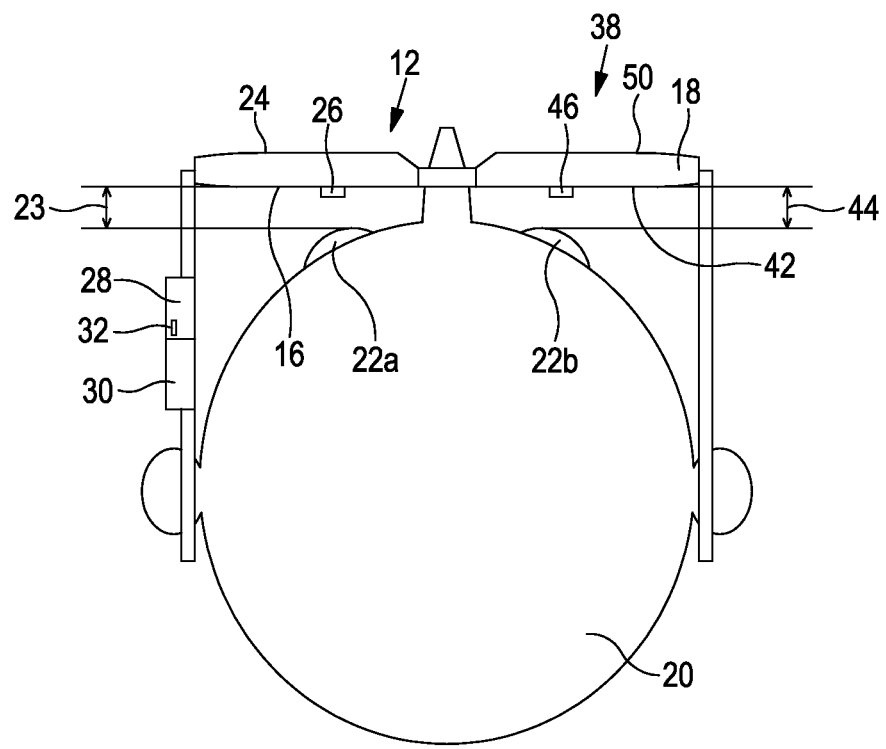

FIGS. 4A, 4B and 4C depict an additional embodiment of an optical device according to the teachings herein, optical device 48. The like-numbered components of optical device 48 are substantially identical to the components of optical device 10 depicted in FIGS. 1A-1C. Optical device 48 further comprises a second transparent pixelated active optical element 50 comprising at least 100 independently-addressable pixels, each one of the pixels having an optical property with a changeable value, second active optical element 50 physically associated with frame 18 and/or second lens 38 so that at least part of the visual field of second eye 22b is covered by both second lens 38 and second active optical element 50.

In some embodiments, the gaze direction of the second eye used by the controller is an estimated gaze direction, e.g., the controller estimates the gaze direction of the second eye on the gaze direction of the first eye and, optionally, other parameters such as distance to a viewed object. In some embodiments, the gaze direction of the second eye used by the controller is a determined and reported by an eye tracker, and the controller receives the determined gaze direction of the second eye.

In some embodiments, the repetition rate of setting the values for the pixels of the first active optical element and the second active optical element are different. In preferred embodiments, the repetition rates are the same.

The details and variants of a second lens are the same as recited above for a first lens. The details and variants of a second transparent pixelated active optical element are the same as recited above for the first transparent pixelated active optical element. The details and variants of a second eye tracker are the same as recited above for the first eye tracker. The operation of the controller with regards to the second transparent pixelated active optical element is the same as recited above for the first active transparent pixelated active optical element. For reasons of brevity, all these details and variants are not repeated here, but the above recitations relating to the components designated as being "first" provide literal support for all the above options for the like components designated as being "second".

The teachings herein can be used for the non-invasive treatment of different vision impairments. Typically, a specific optical device is configured for treatment of one or more specific vision impairments of a specific subject. In some embodiments, such configuration comprises uploading data and/or parameters and/or treatment protocols to the controller. Additionally or alternatively, in some embodiments such configuration comprises configuring specific physical features of the optical device, for example, the optical power of one or two lenses (12 and 38 in the Figures). For some vision impairments, a monocular embodiment of the optical device is sufficient or preferred. For some vision impairments, a binocular embodiment of the optical device is essential or preferred. A person having ordinary skill in the art is able, upon perusal of the specification and figures, to perform the required configurations without resorting to undue experimentation.

The configuration and use of the device for treatment of some specific vision impairments and implementation of methods for treating some specific vision impairments is discussed below.

Refractive Errors

The eye of a full-term human baby is about 1.8 cm long (from the face of the cornea to back of the eye). The eye grows throughout childhood, reaching a length of about 2.5 cm in adulthood where ideally the eye reaches the state of emmetropia where there is a match between the power of the optics of the eye and the axial length of the eye so that in the absence of accommodation, distant images are focused at the photoreceptor layer of the retina.

Emmetropization is the process of achieving emmetropia and involves a reduction in the refractive error that is present at birth, caused by the mismatch between the power of the optics of the eyes and the axial length of the eye. Typically, the refractive state of the eye of a newborn eye is hyperopic (the focal point is beyond the retina) and over time becomes emmetropic. In some instances, the ocular components of the eye, notably the lens and cornea, continue to change and eye growth occurs beyond the time that initial emmetropia is obtained, and the eye becomes myopic (the focal point of the eye is before the retina). It is undisputed that growth of the eye to achieve emmetropization involves visual feedback which is apparently why children who spend prolonged periods of time looking at nearby objects such as books, computer screens and telephone screens often become myopic. The prevalence of myopia is nearly 40% among adults in the United States, and up to 80 percent of young adults in China. Long-term risks associated with high myopia progression include cataracts and retinal detachment.

Clinical observations provide support for the idea that visual signals from the peripheral retina can have a significant impact on emmetropization at the fovea and possibly the genesis of common refractive errors.

In U.S. Pat. No. 7,832,859; WO 2010/129466 and WO 2011/049642 are disclosed contact lenses having at least two concentric zones. The circular central zone is configured to correct for the myopia of the eye of a subject, providing a sharp focused image to the central visual field of retina. A first concentric annular zone around the central zone provides a myopic defocused image that overlaps the sharp focused image. In some embodiments, additional even-numbered concentric annular zones enhance the sharp focused image of the central zone and additional odd-numbered annular zones enhance the myopic defocused image. U.S. Pat. No. 7,832,859 presents clinical data demonstrating that wearing a contact lens for a several months with simultaneously provides two concentrically-overlapping images at the central visual field of the eye, a sharp focused image and a myopic defocused image, slowing the axial growth on the eye and slowing down the myopia progression. This is attributed to the effect the defocused image has on the axial eye growth. US 7,7666,478 describes other type of contact lens with a focused and a defocused image presented to the eye.

In some embodiments, an optical device according to the teachings herein is configured to treat refractive errors such as myopia of one or both eyes of a subject in a manner that is analogous to that described in the art.

It is important to note that, although in some embodiments only a single eye is treated, usually both eyes are treated simultaneously, for each eye the optical device comprises a lens and an associated active optical element. For clarity and brevity, the following description relates to an optical device including a lens and associated active optical element for treating refractive errors of an eye. It is understood that when an optical device includes a single lens and associated active optical element, the description refers to a lens and active optical element physically associated with the frame of the optical device so that at least part of the visual field of the first eye is covered by both the lens and the active optical element. It is also understood that when an optical device includes two lenses and two respective associated active optical elements, the description refers to and provides literal support for both the first lens and the associated first active optical element physically associated with the frame of the optical device so that at least part of the visual field of the first eye is covered by both the first lens and the first active optical element and to the second lens and the associated second active optical element physically associated with the frame of the optical device so that at least part of the visual field of the second eye is covered by both the second lens and the second active optical element.

In embodiments of an optical device configured to treat refractive errors of an eye of a subject, the controller, lens and active optical element are configured so that during operation of the optical device, the lens and a created mask together simultaneously provide two concentrically-overlapping images to the central visual field of the first eye: a sharp focused image and a myopic defocused image, similar to discussed in the above-referenced art. In some embodiments, the created image mask comprises at least two distinct regions, a central first region configured to provide a sharp focused image and a second region surrounding the first region configured to provide a myopic defocused image. Creation of the mask is based on the received gaze direction to ensure that the two images concentrically-overlap and are located at the center of the visual field of the retina of the eye. As a result, the subject wearing the optical device perceives a sharp focused image together with a "halo" (the myopic defocused image), the halo being the portion of the visual field of the eye that is degraded by the optical power of the lens and/or by the created image mask. The relative and absolute size of the two regions of the image mask is determined, inter alia, by the desired relative intensity of the provided sharp focused image and myopic blurred image: increasing the area of a region of the image mask responsible for providing one of the images relative to the area of the other region increases the relative intensity of that image. Accordingly, changing the relative and absolute areas of the regions allows fine tuning the intensity of the treatment and for progressively adjusting the treatment. Similarly, in some embodiments changing the optical power of the regions allows fine tuning the intensity of the treatment and for progressively adjusting the treatment.

In preferred embodiments, the controller creates the image mask also based on the pupil size received from a pupil size determiner. In some embodiments where the image mask comprises at least two portions, a central first region and a second region surrounding the first region, the absolute and relative sizes of the two regions of the image mask are dependent on the determined pupil size, for example larger the pupil the larger the central first region is. Further, as is known in the art, all other things being equal, a larger pupil size reduces the sharpness of an image formed on the retina of an eye when compared to a smaller pupil size. Accordingly, in some preferred embodiments the pupil size also influences the optical power of central first region of the image mask to ensure that the sharp focused image is sharp and focused. Accordingly, in some preferred embodiments the pupil size also influences the optical power of peripheral second region to ensure that the defocused image is defocused enough to enable myopia control. Pupil size is known to change for various reasons including ambient light conditions, vergence and viewing distance.

Some specific embodiments of the teachings herein suitable for treating refractive errors are discussed below.

Figure 5A:
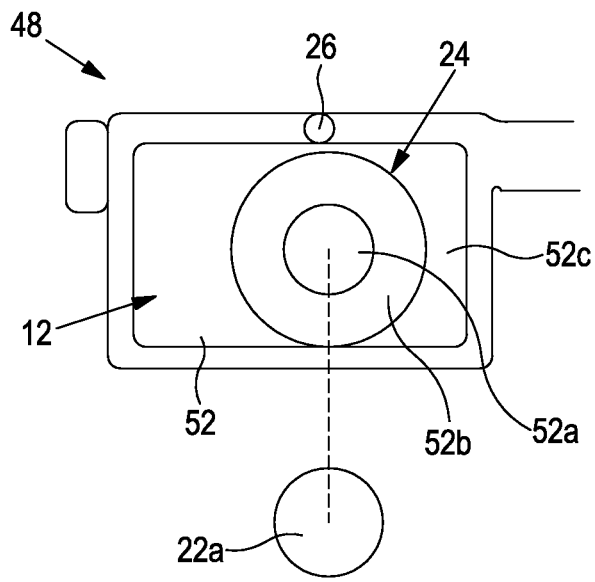
FIGS. 5A and 5B depict an embodiment where an optical device such as depicted in FIGS. 4A-4C is used to create an image mask for treating refractive errors such as myopia.

In some embodiments, the controller is configured to create an image mask including at least two regions, a central first region for providing the sharp focused image and a second region surrounding the first region for providing the myopic defocused image. In FIG. 5A (gaze direction is straight ahead) and 5B (gaze direction to the left) are depicted a portion of an optical device similar or identical to device 48 depicted in FIGS. 4A-4C in a view from the back towards the proximal side having a first lens 12 and an associated first active optical element 24, depicted with already-created image mask 52. Image mask 52 has three regions:

a circular central first region 52a for providing a sharply focused image to an eye;

a second region 52b for degrading a portion of the visual field of first eye 22a to provide the desired myopic defocused image; and a third region 52c that makes up the balance of the pixels of first active optical element 24. In some embodiments where lens 12 is an optimal corrective lens, first region 52a can be set to have no optical power.

Controllable Optical Power

In some such embodiments, lens 12 is a plano lens and an optical property with a changeable value is a property of the pixels that provides controllable optical power for the active optical element, optionally also with changeable light transmission. In such embodiments, the pixels of first region 52a are set so that first region 52a constitutes a lens having an optical power to provide a sharp focused image while the pixels of second region 52b are set to some other value, thereby providing a lens having an optical power that provides a myopic defocused image.

In some such embodiments, lens 12 is a refracting lens and an optical property with a changeable value is a property of the pixels that provides controllable optical power for the active optical element, optionally also with changeable light transmission. In preferred such embodiments, the refracting lens (whether simple or complex) is preferably configured as known in the art of ophthalmology to correct the refractive errors of the eye. In such embodiments, the pixels of first region 52a are set so that first region 52a constitutes a lens having an optical power to provide a sharp focused image (in some instances focusing in addition to the focusing attributable to the optical power of the lens and in some embodiments, where the lens has sufficient optical power, first region 52a constitutes a plano lens, optionally correcting for aberrations in lens 12). In such embodiments, the pixels of second region 52b are set to some other value, thereby providing a lens having an optical power that provides a myopic defocused image, typically requiring neutralization of the correction provided by the optical power of lens 12. Thus, in some such embodiments, refracting lens 12 is configured to correct refractive errors of the eye and first region 52a of image mask 52 operates together with refracting lens 12 to improve a respective portion of the visual field (to provide a sharp focused image) while second region 52b of image mask 52 counters at least some of the improvement provided by refracting lens 12 to degrade a respective portion of the visual field (to provide a myopic defocused image).

Alternatively, in some such embodiments, refracting lens 12 is configured to degrade the visual field of the eye and first region 52a of image mask 52 counters refracting lens 12 by improving the respective portion of the visual field (to provide a sharp focused image) while second region 52b of image mask 52 operates together with refracting lens 12 to degrade the respective portion of the visual field (to provide a myopic defocused image).

Similarity Between Two Image Masks

Figure 5B:
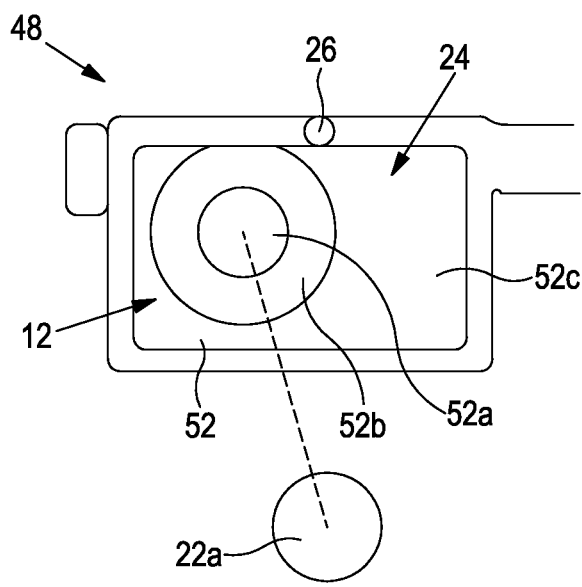

In FIG. 5A, first region 52a is circular and second region 52b is annular and concentric with first region 52a. In FIG. 5B, first region is circular and second region 52b is almost annular as the top portion of second region 52b is truncated by the border of first active optical element 24.

In some embodiments, refractive lens 12 is a complex lens having at least two portions, each such portion of the lens having a different optical power. In such embodiments, a created image mask 52 is complex as the values of the changeable property of the pixels must account for the optical power of the portion of the lens that is directly associated with each pixel. Accordingly, in embodiments where refracting lens is a complex lens the image masks 52 in FIGS. 5A and 5B are in reality different.

In some embodiments, the controller also creates the two image masks 52 to correct for aberrations in lens 12: in such embodiments, a further difference between the two image masks 52 is the differences that are required to correct for the lens aberrations.

In some such embodiments, a further difference between the two image masks 52 are differences dictated by different pupil size that can occur due to a different vergence or different range to an observed object.

Despite such differences as listed above, the two image masks 52 depicted in FIGS. 5A and 5B are considered substantially identical as the therapeutic effect of the combined optical powers of lens 12 and the respective image masks 52 is the same relative to the gaze direction of eye 22a.

In the embodiments discussed above suitable for treating refractive errors, the created image mask comprises at least two distinct regions, a central first region configured to provide a sharp focused image and a second region surrounding the first region configured to provide a myopic defocused image, where the absolute and relative sizes of the two regions are preferably dependent on a determined pupil size. In some embodiments, the image mask comprises further regions configured to either enhance the sharp focused image provided by the first region or to enhance the myopic defocused image provided by the second region. Typically, such further regions are each in the form of a ring that surrounds a preceding ring and is configured to enhance the one of the two images different from the image enhanced by the preceding ring. For example, in some embodiments the image mask comprises a third region that surrounds the second region and is configured to enhance the sharp focused image provided by the first region. For example, in some embodiments the image mask comprises a fourth region that surrounds the third region and is configured to enhance the myopic defocused image provided by the second region.

Amblyopia

Amblyopia is a vision defect where the two images perceived from the two eyes are so different that the brain cannot fuse them into one united image. When the two images from the two eyes cannot be fused, confusion occurs. In order to avoid the confusion, the brain tends to ignore one of the two images, usually the one with the lower contrast or the one provided from an eye with deviating gaze direction, and amblyopia occurs. The brain uses the image perceived from the non-amblyopic eye, the amblyopic eye suffers from lower visual acuity and, as a result, the subject primarily sees with the non-amblyopic eye and loses at least some of the binocular vision. WO 2018/055618 and U.S. Pat. No. 10,251,546 teach that by displaying a poor-quality image to the central vision of the non-amblyopic eye, the brain can be trained to use the amblyopic eye, thereby improving the visual performance of that eye such as the visual acuity of the amblyopic eye and binocular vision.

For treatment of amblyopia in a subject according to the teachings herein, either a monocular or binocular optical device is provided.

In embodiments where a monocular optical device is used, an image mask is created using the active optical element to degrade the vision of the non-amblyopic eye in a manner analogous to the teachings of WO 2018/055618 and U.S. Pat. No. 10,251,546.

In embodiments where a binocular optical device is used, a mask is created using the first active optical element to degrade the vision of the non-amblyopic eye in a manner analogous to the teachings of WO 2018/055618 and U.S. Pat. No. 10,251,546 and a second lens and/or second active optical element is optionally used to improve the vision of the amblyopic eye.

(First) Active Optical Element for the Non-Amblyopic Eye

WO 2018/055618 and U.S. Pat. No. 10,251,546 teach that it is advantageous to display an image to the non-amblyopic eye of a person suffering from amblyopia where the portion of the image that is seen by the central vision of the non-amblyopic eye is blurred to a degree (in terms of size of the degraded portion and level of degradation) sufficient to reduce inter-ocular suppression, thereby allowing the visual system to activate the amblyopic eye and enable using the two eyes simultaneously, so that the brain perceives the images received from both eye. At the same time, it is preferable to keep the peripheral portions of the image that are seen by the non-central vision of the non-amblyopic eye less degraded or not at all degraded, thereby assisting the fusion of the images by the brain and enhancing compliance as a large part of the non amblyopic eye image is sharp.

In some embodiments of the teachings herein suitable for the treatment of amblyopia, the (first) active optical element and the controller of the vision are together configured to create an image mask that divides the (first) active optical element into two different zones:

a first central zone corresponding to a central portion of the visual field of the non-amblyopic eye; and a second zone surrounding the first central zone corresponding to a non-central portion of the visual field of the non-amblyopic eye;

wherein:

the first central zone is configured for degraded passage of light therethrough; and the second zone is configured for passage of light therethrough that is better than the degraded passage through the first central zone.

In some embodiments, the first central zone covers at least 2% of the central visual field of the eye, the central visual field of the non-amblyopic eye corresponding to the foveal visual field having angular dimensions of 4°-6°. In some embodiments, the first central zone covers at least 20%, at least 30%, at least 40%, at least 60%, at least 80% of the central visual field of the amblyopic eye.

In some embodiments, the second zone has an angular dimension of at least 2° around the first central zone. In some embodiments, the second zone covers the balance of the active optical element.

In some embodiments suitable for treating amblyopia, the (first) lens for the non-amblyopic eye is a plano lens which primary purpose is supporting the (first) active optical element in the correction position. In preferred embodiments suitable for treating amblyopia, the (first) lens for the non-amblyopic eye is a refracting lens. In such embodiments, any suitable refracting lens is used, preferably for correcting vision defects of the non-amblyopic eye as is known in the art of ophthalmology.

In embodiments the optical property with a changeable value is a property of the pixels that provides controllable optical power for the (first) active optical element. the configuration of the first central zone for degraded passage of light therethrough comprises, and in some embodiments consists of, the controller setting the pixels corresponding to the first central zone so that the light passing through the first central zone is less focused on portions of the retina than light passing through the second zone, so that light passing through the first central zone produces a less focused (and thereby degraded) image on the retina than the second zone.

In embodiments where a changeable optical property of the pixels of the (first) active optical element is the degree of transmission of light, in some embodiments the configuration of the first central zone for degraded passage of light therethrough comprises, and in some embodiments consists of, the controller setting the pixels corresponding to the first central zone to a lower light transmission than pixels corresponding to the second zone.

In embodiments where the changeable optical property is both of the mentioned above, either or both of the above image mask configurations can be used.

Amblyopic Eye

As noted above, according to an embodiment of the teachings herein suitable for the treatment of amblyopia, the vision of the amblyopic eye is preferably either left unaffected or is improved. When a monocular optical device is used, the vision of the amblyopic eye is left unaffected. When a binocular optical device is used, the vision of amblyopic eye is optionally improved using a second refracting lens, a second active optical element, or a second refracting lens together with a second active optical element.

Thus, in some embodiments, no or a non-corrective second lens is provided for the amblyopic eye.

In preferred embodiments, a second refracting lens is provided for the amblyopic eye, configured to correct the vision of the amblyopic eye in the usual way as is known to a person skilled in ophthalmology, preferably optimal correction, to allow improved vision by the amblyopic eye.

In preferred embodiments, the amblyopic eye is not provided with a second active optical element associated with the second lens.

In some embodiments, the amblyopic eye is provided with a second active optical element, e.g., for correcting aberrations in a corrective (second) lens and/or to increase the optical power of the second lens when needed.

Amblyopia with microtropia is a vision impairment where the gaze directions of the two eyes deviate one from the other at a small angle of deviation, typically below 8 prism diopters. To compensate for this deviation, the amblyopic eye develops a "preferred retinal location" in the parafovea of the retina which acquires images. In some embodiments where a binocular optical device is configured to treat amblyopia with microtropia, in addition to using a first active optical element to blur/block the central visual field of the non-amblyopic first eye as described above, the controller is configured to create an image mask using a second active optical element to blur/block the preferred retinal location of the amblyopic second eye. In such a way, the visual system of the subject is encouraged to use the anatomical fovea of the amblyopic eye.

Figure 6A:
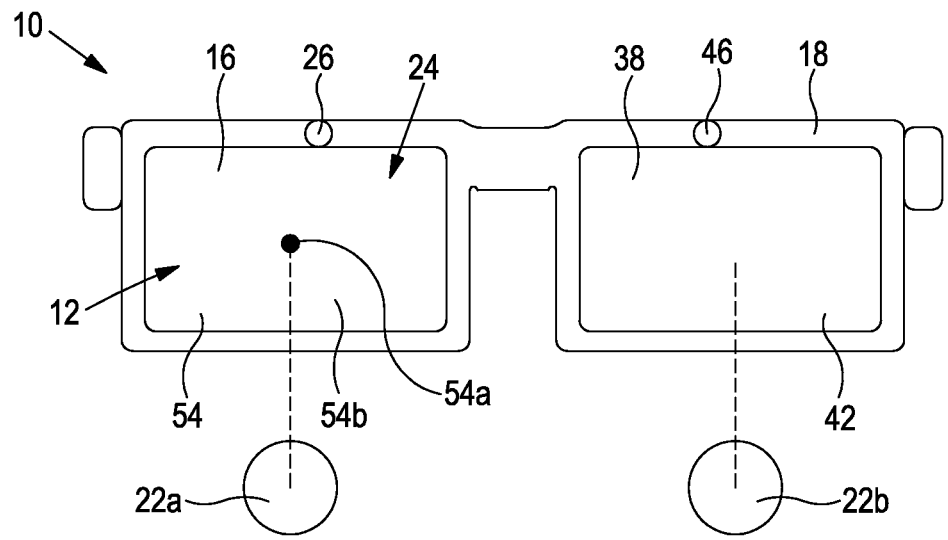
FIGS. 6A and 6B depict an embodiment where an optical device such as depicted in FIGS. 1A-1C is used to create an image mask for treatment of amblyopia or AMD.
Figure 6B:
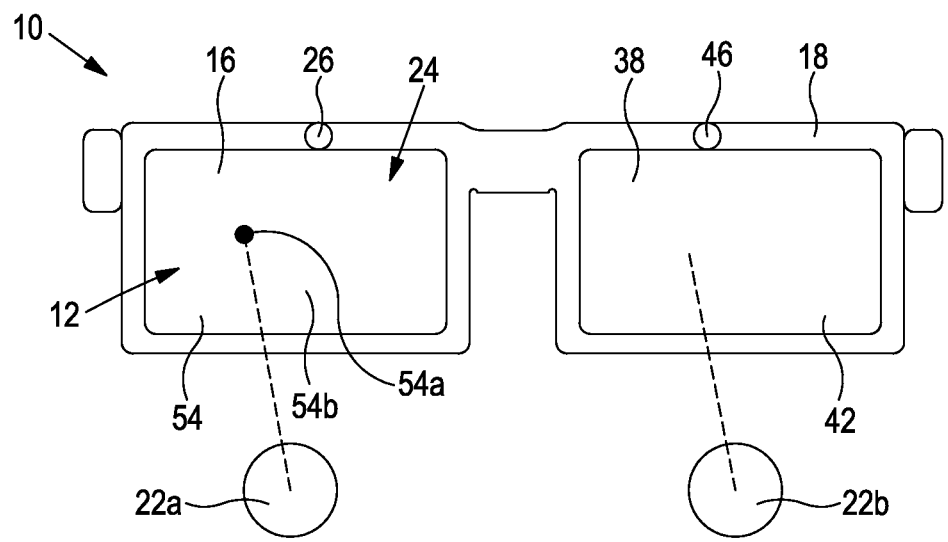

Exemplary embodiments of the teachings herein suitable for treating amblyopia (using an optical device 10 with a single active optical element 24 as depicted in FIGS. 1A-1C) is depicted with reference to FIGS. 6A and 6B, a view of optical device 10 from the back toward the proximal side. In FIG. 6A the gaze direction of eye 22a is straight ahead. In FIG. 6B the gaze direction of eye 22a is to the left.

The subject to be treated has amblyopia where the left eye, (first eye 22a) is the dominant non-amblyopic eye and the right eye (second eye 22b) is the amblyopic eye.

Before first eye 22a is a (first) lens 12 with a (first) active optical element 24. In some embodiments, (first) lens 12 is a plano lens which primary purpose is to physically support (first) active optical element 24 in place before first eye 22a. In alternate embodiments, (first) lens 12 is a refracting lens configured as known in the art of ophthalmology, to at least partially correct the vision of first eye 22a, preferably, to optimally correct the vision of first eye 22a.

When optical device 10 is operated, the controller (not depicted) uses (first) active optical element 24 with reference to an eye tracker 26 to track the gaze direction of first eye 22a to create an image mask 54. Mask 54 comprises a first zone 54a and a second zone 54b. Light reflected from an object that passes through first zone 54a to reach the central portion of the visual field of first eye 22a while light reflected from an object that passes through second zone 54b reaches portions of the retina of first eye 22a that do not correspond to the central portion of the visual field.

In embodiments where the changeable optical property of the pixels of (first) active optical element 24 is light transmission, the pixels of first zone 54a are all set for a light transmission lower than the light transmission of the pixels of second zone 54b. The pixels of first zone 54a are set to a light transmission that is sufficiently low to degrade the vision of the central portion of the visual field of first eye 22a to the extent that amblyopic second eye 22b is used. The pixels of second zone 54b are typically, but not necessarily set for the higher light transmission, even maximal light transmission therethrough. In such embodiments, mask 54 degrades the central portion of the visual field of non-amblyopic first eye 22a to effectively have inferior vision compare to that of amblyopic second eye 22b so that amblyopic second eye 22b is used, while the non-central portion of the visual field of non-amblyopic first eye 22a is not substantially degraded, allowing image fusion.

In embodiments where the optical property with a changeable value is a property of the pixels that provides controllable optical power for active optical element 24, the pixels of first zone 54a are all set for blurring (defocusing) of light onto the central portion of the visual field compared to the focusing of the pixels of second zone 54b onto the non-central portion of the visual field. Preferably, the pixels of first zone 54a are set to a degree of blurring that is sufficiently low to degrade the vision of the central portion of the visual field of first eye 22a to the extent that amblyopic second eye 22b is used. The pixels of second zone 54b are typically, but not necessarily set for focusing light onto the non-central portion of the visual field so that images in the non-central vision of first eye 22a are focused and sharp. In such embodiments, mask 54 causes the central portion of the visual field of non-amblyopic first eye 22a to effectively have inferior vision to that of second eye 22b so that amblyopic second eye 22b is used, while the non-central portion of the visual field of non-amblyopic first eye 22a is substantially unchanged or even improved, allowing image fusion. Alternatively or additionally, in some embodiments, the pixels of second zone 54b are set to compensate for aberrations in (first) lens 12. Alternatively or additionally, in some embodiments the pixels of second zone 54b are set to be neutral, neither focusing nor de-focusing light.

In embodiments where the pixels of (first) active optical element 24 have both changeable properties, any suitable combination of the above is used to achieve the desired goal: mask 54 degrading the central portion of the visual field of non-amblyopic first eye 22a to effectively have inferior vision to that of second eye 22b so that amblyopic second eye 22b is used, while the non-central portion of the visual field of non-amblyopic first eye 22a is substantially unchanged or improved, allowing image fusion.

With regards to amblyopic second eye 22b, when optical device 10 depicted in FIGS. 6A and 6B is a monocular optical device, in some embodiments, component 34 before second eye 22b is absent. In alternative such embodiments, component 34 is a transparent plano lens, primarily present to protect second eye 22b and to provide a more aesthetic appearance to increase subject compliance.

With regards to amblyopic second eye 22b, when optical device 10 depicted in FIGS. 6A and 6B is a binocular optical device, second lens 38 is a transparent refracting lens, configured as known in the art of ophthalmology for correcting vision defects of second eye 22b, preferably optimal correction as known in the art of ophthalmology.

In some embodiments, a binocular optical device such as optical device 44 depicted in FIGS. 4A-4C comprising a second active optical element 50 associated with second lens 38 is configured for treating amblyopia. In such embodiments, degrading the visual field of the amblyopic eye is as described above with reference to FIGS. 6A and 6B. In some such embodiments, second lens 38 is a plano lens which primary purpose is to physically support second active optical element 50 in place before amblyopic second eye 22b. In some embodiments, second lens 38 is a refracting lens, configured as known in the art of ophthalmology for correcting vision defects of amblyopic second eye 22b, preferably optimal correction. For example, in cases where amblyopic second eye 22b suffers from anisometropia, correction by second lens 38 and/or second active optical element 50 (if configured that the optical property with a changeable value is a property of the pixels that provides controllable optical power).

Macular Vision Damage

AMD (age-related macular degeneration) is a disease of the eye characterized by progressive loss of central vision due to degeneration of the macula. Often, a subject suffering from AMD develops a pseudofovea. Specifically, the brain selects one or more still-functioning portions of the retina and uses these portions for vision instead of the damaged portions of the retina. Due to the inherent lower density of light-sensing cells in the non-foveal portions of the retina, such pseudofovea do not restore vision but do allow a person to function.

For assisting and training of a subject with macular vision damage according to the teachings herein, an optical device is provided. The controller of the provided optical device is configured so as to create an image mask that stimulates a selected retinal area outside the fovea forcing the use of a selected pseudofovea by one eye (the first eye) or both eyes (the first eye and the second eye). For brevity and clarity, the below description will relate to assisting and training of a single eye using an optical device having a lens and an active optical element. It is understood that in embodiments having an optical device with a first lens and a first active optical element for a first eye, and a second lens and a second active optical element for a second eye, the below description relates to the first lens and first active optical element for the first eye and, in embodiments where both eyes are treated also relates to the second lens and second active optical element for the second eye.

According to the teachings herein, an optical device is configured and used to assisting and training a first eye of a subject suffering from macular vision damage. Such configuration and use are effective for developing a pseudofovea, improving the vision of the first eye. Specifically, an optical device is provided with a lens and an active optical element so that at least part of the visual field of the first eye is covered by both the lens and the active optical element.

In some embodiments, the lens is a plano lens. Alternatively, in preferred embodiments, the lens is a refracting lens configured to correct the vision of the first eye in the usual way as is known to a person skilled in ophthalmology, preferably optimal such correction.

The active optical element and controller are together configured to create an image mask that allows only a narrow visual field for a pseudofovea of the first eye.

For configuration of the optical device, a health-care professional such as an ophthalmologist identifies a pseudofovea or a portion of the retina that is chosen as a candidate to be a pseudofovea.

In embodiments where the optical property with a changeable value is a property of the pixels that provides controllable optical power for the active optical element, the data and parameters are set so that light reflected from an object to be viewed by the pseudofovea is focused, preferably as focused as possible, so that an image of the object formed on the pseudofovea is focused and is therefore more visible. Additionally, in some such embodiments, light reflected from an object to be viewed by portions of the visual field of the eye other than the pseudofovea are defocused and therefore degraded.

In embodiments where the active optical element includes pixels with a changeable value for light transmission, the data and parameters are set so that light reflected from an object to be viewed by the pseudofovea passes through pixels that are all set for a light transmission higher (preferably maximal light transmission) than the light transmission of the pixels that correspond to portions of the visual field of the eye other than the pseudofovea. As a result, the portions of the image of the object formed on the pseudofovea is easily visible and sharp compared to the portions of the image of the object formed on the rest of the retina, so that the brain of the subject preferably uses the parafovea. In some such embodiments, light reflected from an object to be viewed by portions other than the pseudofovea passes through pixels that are set to transmit very little or even no light.

In such a way, the active optical element is used to create an image mask that, when activated, leads to the eye having virtual tunnel vision, the tunnel being actively centered on the pseudofovea with reference to the eye tracker.

Thus, in some embodiments configured for assisting and training of macular vision damage, the image mask divides the active optical element into at least two different zones:
 a first zone of the active optical element corresponding to a non-foveal portion of the visual field of the eye defining a pseudofovea; and
 a second zone of the active optical element corresponding to portions of the retina surrounding the pseudofovea,
so that all parts of the active optical element corresponding to the pseudofoveal first zone are less opaque (e.g., have greater light transmission and/or are more focused) than all parts of the active optical element corresponding to the non-pseudofoveal second zone.

In some embodiments, the first pseudofoveal zone of the active optical element are such that the pseudofovea has angular dimensions of more than about 1° and less than about 8°.

An exemplary embodiment of the teachings herein suitable for treating macular degeneration using a device 10 with a single active optical element 24 as depicted in FIGS. 1A-1C is depicted with reference to FIGS. 6A and 6B. In FIG. 6A, the gaze direction of eyes 22a and 22b is straight ahead. In FIG. 6B, the gaze direction of eyes 22a and 22b is to the left. For clarity and brevity, in the following description component 12 will be referred to as lens 12, but it is understood that this refers also to first lens 12. Similarly, component 24 will be referred to as active optical element 24, but it is understood that this refers also to first active optical element 24.

The subject to be assisted and trained has macular degeneration where a health-care professional decided to stimulate development of a pseudofovea in left eye, first eye 22a.

Before first eye 22a is a lens 12 with an active optical element 24. In some embodiments, lens 12 is a plano lens which primary purpose is to physically support active optical element 24 in place before first eye 22a. In preferred embodiments, lens 12 is a refracting lens configured as known in the art of ophthalmology, to at least partially correct the vision of first eye 22a, preferably to the maximum extent possible.

When optical device 10 is operated, the controller (not depicted) uses active optical element 24 with reference to an eye tracker 26 to track the gaze direction of first eye 22a to create a mask 54. Mask 54 comprises a first zone 54a and a second zone 54b. Light reflected from an object that passes through first zone 54a to reach the pseudofovea of first eye 22a while light reflected from an object that passes through second zone 54b reaches portions of the retina of first eye 22a other than the pseudofovea.

In embodiments where the changeable optical property of the pixels of active optical element 24 is light transmission, the pixels of first zone 54a are all set for a light transmission that is higher than the light transmission of the pixels of second zone 54b. Preferably, the pixels of first zone 54a are set for the highest possible light transmission while pixels of second zone 54b are set for the lowest possible light transmission. In such embodiments, mask 54 causes first eye 22a to effectively have tunnel vision where the only portion of the retina that is stimulated is the pseudofovea while the vision of the rest of the retina is degraded.

In embodiments where the changeable optical property of the pixels of active optical element 24 is a property of the pixels that provides controllable optical power for the active optical element, the pixels of first zone 54a are all set for greater focusing of light onto the pseudofovea compared to the focusing of the pixels of second zone 54b. In some embodiments, the pixels of first zone 54a are set for optimal focusing of reflected light onto the pseudofovea of first eye 22a. Alternatively or additionally, in some embodiments, the pixels of first zone 54a are set to compensate for aberrations in (first) lens 12. Alternatively or additionally, in some embodiments the pixels of second zone 54b are set to be neutral, neither focusing nor de-focusing light. In some embodiments, the pixels of second zone 54b are set to defocus light onto portions of the retina of first eye 22a that do not correspond to the pseudofovea, thereby degrading the vision of the non-pseudofovea portions of the retina.

In embodiments where the pixels of active optical element 24 have both changeable properties, any suitable combination of the above is used. In preferred embodiments, the light transmission of pixels of second zone 54b are set for minimal light transmission, the light transmission of pixels of first zone 54a are set for maximal light transmission, and the pixels of first zone 54a are set for optimal focusing of reflected light onto the pseudofovea of first eye 22a and for correction of aberrations in first lens 12.

The above description related to use of an optical device 10 for developing a pseudofovea of first eye 22a. In some embodiments, component 38 before second eye 22b is absent or plano lens. Alternatively, in some embodiments, component 38 before second eye 22b is a refracting lens for correcting vision defects of second eye 22b as known in the art of ophthalmology. Alternatively, an optical device having a second active optical element before the second eye, such as device 48 depicted in FIGS. 4A-4C is used for concurrently developing a pseudofovea of second eye 22b. In such embodiments, the configuration and use of such a second active optical element and associated second lens is as described above for first active optical element 24 and first lens 12

Unless otherwise defined, all technical and scientific terms used herein have the same meaning as commonly understood by one of ordinary skill in the art to which the invention pertains. In case of conflict, the specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof.

As used herein, the indefinite articles "a" and "an" mean "at least one" or "one or more" unless the context clearly dictates otherwise.

As used herein, when a numerical value is preceded by the term "about", the term "about" is intended to indicate +/−10%.

As used herein, a phrase in the form "A and/or B" means a selection from the group consisting of (A), (B) or (A and B). As used herein, a phrase in the form "at least one of A, B and C" means a selection from the group consisting of (A), (B), (C), (A and B), (A and C), (B and C) or (A and B and C).

Embodiments of methods and/or devices described herein may involve performing or completing selected tasks manually, automatically, or a combination thereof. Some methods and/or devices described herein are implemented with the use of components that comprise hardware, software, firmware or combinations thereof. In some embodiments, some components are general-purpose components such as general purpose computers or digital processors. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A wearable optical device for a human subject, comprising:
   a. a transparent lens having a distal surface and a proximal surface;
   b. a wearable frame configured, when worn by a human subject, to maintain said proximal surface of said lens in front of a first eye of the subject at a distance of not less than 5 mm and not more than 50 mm from the surface of the cornea of the first eye so that at least part of the visual field of the first eye is covered by said lens when the gaze direction of the first eye is straight ahead;
   c. a transparent pixelated active optical element comprising at least 100 independently-addressable pixels, each one of said pixels having an optical property with a changeable value, the active optical element physically associated with said frame and/or said lens so that at least part of the visual field of the first eye is covered by both said lens and said active optical element;
   d. an eye tracker configured to determine and report the gaze direction of the first eye; and
   e. a controller having a digital memory configured to:
      i. receive from said eye-tracker a determined gaze direction of the first eye; and
      ii. at a repetition rate, set a value for a said optical property of said at least 100 pixels of said active optical element so as to create an image mask through which at least some of the light reaching the first eye passes through, thereby modifying the image formed on the retina of the first eye,
   wherein said value for a said optical property is based on a received gaze direction and the optical power of said, and wherein said controller, said lens and said active optical element are together configured so that during operation of the optical device, at least a portion of the visual field of the first eye is degraded by the optical power of said lens and/or by said created image mask.

2. The optical device of claim 1, further comprising:
   a pupil size determiner configured to determine and report the size of the pupil of the first eye, and
   said controller is configured to receive from said pupil size determiner a determined pupil size of the first eye, and
   said value for a said optical property is also based on a received pupil size.

3. The optical device of claim 2, wherein said pupil size determiner and said eye tracker are the same component.

4. The optical device of claim 2, wherein said pupil size determiner is a component different from said eye tracker.

5. The optical device of claim 1, wherein said frame and said lens are together configured to that at least 30% of the visual field of the first eye is covered by said lens when the gaze direction of the first eye is straight ahead.

6. The optical device of claim 1, wherein said part of the visual field of the first eye that is covered by both said lens and said active optical element is at least 20% of the visual field of the first eye when the gaze direction of the first eye is straight ahead.

7. The optical device of claim 1, wherein said active optical element comprises at least 400 said independently addressable pixels.

8. The optical device of claim 1, wherein said optical property with a changeable value is a property of the pixels that provides controllable optical power for the active optical element.

9. The optical device of claim 1, wherein said optical property with a changeable value is light transmission of the pixels.

10. The optical device of claim 1, wherein said optical property is both a property of the pixels that provides controllable optical power for the active optical element and light transmission of the pixels.

11. The optical device of claim 1, wherein said lens is a plano lens.

12. The optical device of claim 1, wherein said lens is a refracting lens having a non-zero optical power.

13. The optical device of claim 12, wherein said lens is a simple refracting lens having a single constant optical power over the entire said lens.

14. The optical device of claim 12, wherein said lens is a complex refracting lens having at least two portions, each said portion having a different optical power.

15. The optical device of claim 12, wherein said lens is configured to degrade at least a portion of the visual field of the first eye of the subject.

16. The optical device of claim 12, wherein said controller is configured to create a said image mask having a portion that decreases an image modification done by said lens.

17. The optical device of claim 12, wherein said controller is configured to create a said image mask having a portion that amplifies an image modification done by said lens.

18. The optical device of claim 1, wherein said image mask is created in such a way so that the image formed on the retina of the first eye is a therapeutic image.

19. The optical device of claim 1, wherein two succeeding image masks created based on two respective received gaze directions are created so that the modifying of an image formed on the retina of the first eye by said two succeeding images is substantially the same.

20. The optical device of claim 1, wherein:
   said eye-tracker is configured to determine and report the gaze direction the first eye to said controller at a rate of not slower than 1 Hz; and
   said controller is configured to create a new said image mask based on a received gaze direction at said repetition rate of not slower than 1 Hz.

21. The optical device of claim 1, wherein said transparent lens is a first lens of the optical device, and the optical device further comprises:
   a second transparent lens having a distal surface and a proximal surface; said wearable frame configured, when worn by the subject, to maintain said proximal surface of said second lens in front of a second eye of the subject at a distance of not less than 5 mm and not more than 50 mm from the surface of the cornea of said second eye so that at least part of the visual field of said second eye is covered by said second lens when the gaze direction of said second eye is straight ahead.

22. The optical device of claim 21, wherein said second lens is a plano lens.

23. The optical device of claim 21, wherein said second lens is a refracting lens.

24. The optical device of claim 21, wherein said active optical element is a first active optical element of the optical device, and the optical device further comprises:
   f. a second transparent pixelated active optical element comprising at least 100 independently-addressable pixels, each one of said pixels having an optical property with a changeable value, said second active optical element physically associated with said frame and/or said second lens so that at least part of the visual field of the second eye is covered by both said second lens and said second active optical element; and
   said controller further configured to:
      iii. at a repetition rate, set a value for a said optical property of said at least 100 pixels of said second active optical element so as to create an image mask through which at least some of the light reaching the second eye passes through, thereby modifying the image formed on the retina of the second eye,
   wherein said value for a said optical property is based on a gaze direction of the second eye and the optical power of said second lens.

25. The optical device of claim 24, wherein said controller, said second lens and said second active optical element are together configured so that during operation of the optical device, at least a portion of the visual field of the second eye is degraded by the optical power of said second lens and/or by said created image mask.

* * * * *

UNITED STATES PATENT AND TRADEMARK OFFICE
CERTIFICATE OF CORRECTION

PATENT NO. : 11,360,328 B1
APPLICATION NO. : 17/503321
DATED : June 14, 2022
INVENTOR(S) : Ran Yam et al.

It is certified that error appears in the above-identified patent and that said Letters Patent is hereby corrected as shown below:

In the Claims

Claim 1, Column 30, Line 26, insert --lens-- after "and the optical power of said".

Signed and Sealed this
Twentieth Day of December, 2022

Katherine Kelly Vidal
*Director of the United States Patent and Trademark Office*